US011991810B2

(12) United States Patent
Okoniewski et al.

(10) Patent No.: US 11,991,810 B2
(45) **Date of Patent: *May 21, 2024**

(54) MULTILATERAL OPEN TRANSMISSION LINES FOR ELECTROMAGNETIC HEATING AND METHOD OF USE

(71) Applicant: Acceleware Ltd., Calgary (CA)

(72) Inventors: Michal M. Okoniewski, Calgary (CA); Damir Pasalic, Calgary (CA); Pedro Vaca, Calgary (CA)

(73) Assignee: Acceleware Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,003

(22) Filed: Jun. 21, 2023

(65) Prior Publication Data

US 2023/0403768 A1 Dec. 14, 2023

Related U.S. Application Data

(63) Continuation of application No. 17/431,983, filed as application No. PCT/CA2020/050279 on Mar. 2, 2020, now Pat. No. 11,729,870.

(Continued)

(51) Int. Cl.
*E21B 43/24* (2006.01)
*H05B 6/52* (2006.01)
*H05B 6/62* (2006.01)

(52) U.S. Cl.
CPC ........... *H05B 6/62* (2013.01); *E21B 43/2401* (2013.01); *H05B 6/52* (2013.01); *H05B 2214/03* (2013.01)

(58) Field of Classification Search
CPC ....... E21B 43/2401; E21B 43/24; H05B 6/62; H05B 6/52; H05B 2214/03
See application file for complete search history.

(56) References Cited

U.S. PATENT DOCUMENTS 2,402,622 A 6/1946 Hansen
2,757,738 A 8/1956 Ritchey
(Continued)

FOREIGN PATENT DOCUMENTS

CA 2816101 A1 5/2012
CA 2895595 A1 12/2015
(Continued)

OTHER PUBLICATIONS

International Search Report and Written Opinion dated May 25, 2020 in International Patent Application No. PCT/CA2020/050279 (8 pages).

(Continued)

*Primary Examiner* — Taras P Bemko
(74) *Attorney, Agent, or Firm* — BERESKIN & PARR LLP/ S.E.N.C.R.L. s.r.l; Isis E. Caulder; Maria Wei

(57) ABSTRACT

An apparatus and method for electromagnetic heating of a hydrocarbon formation. The apparatus includes an electrical power source; at least one electromagnetic wave generator for generating alternating current; at least two transmission line conductors positioned in the hydrocarbon formation; at least one waveguide for carrying the alternating current from the at least one electromagnetic wave generator to the at least two transmission line conductors; and a producer well to receive heated hydrocarbons from the hydrocarbon formation. The transmission line conductors are excitable by the alternating current to propagate a travelling wave within the hydrocarbon formation. At least one of the transmission line conductors include a primary arm and at least one secondary arm extending laterally from the primary arm. The at least one secondary arm includes at least one electrically isolatable connection for electrically isolating at least a portion of the secondary arm.

20 Claims, 10 Drawing Sheets

Related U.S. Application Data

(60) Provisional application No. 62/814,389, filed on Mar. 6, 2019.

(56) References Cited

U.S. PATENT DOCUMENTS

| | | | |
|---|---|---|---|
| 3,909,757 | A | 9/1975 | Miyamoto et al. |
| 4,135,579 | A | 1/1979 | Rowland et al. |
| 4,140,179 | A | 2/1979 | Kasevich et al. |
| 4,140,180 | A | 2/1979 | Bridges et al. |
| 4,144,935 | A | 3/1979 | Bridges et al. |
| 4,193,451 | A | 3/1980 | Dauphine |
| RE30,738 | E | 9/1981 | Bridges et al. |
| 4,301,865 | A | 11/1981 | Kasevich et al. |
| 4,319,632 | A | 3/1982 | Marr, Jr. |
| 4,320,801 | A | 3/1982 | Rowland et al. |
| 4,449,585 | A | 5/1984 | Bridges et al. |
| 4,470,459 | A | 9/1984 | Copland |
| 4,487,257 | A | 12/1984 | Dauphine |
| 4,490,727 | A | 12/1984 | Kowols |
| 4,508,168 | A | 4/1985 | Heeren |
| 4,513,815 | A | 4/1985 | Rundell et al. |
| 5,236,039 | A | 8/1993 | Edelstein et al. |
| 5,484,985 | A | 1/1996 | Edelstein et al. |
| 6,189,611 | B1 | 2/2001 | Kasevich |
| 6,413,399 | B1 | 7/2002 | Kasevich |
| 6,932,155 | B2 | 8/2005 | Vinegar et al. |
| 7,009,471 | B2 | 3/2006 | Elmore |
| 7,182,151 | B2 | 2/2007 | Stump et al. |
| 7,194,297 | B2 | 3/2007 | Talpade et al. |
| 7,250,916 | B2 | 7/2007 | Kunysz et al. |
| 7,567,154 | B2 | 7/2009 | Elmore |
| 7,891,421 | B2 | 2/2011 | Kasevich |
| 8,196,658 | B2 | 6/2012 | Miller et al. |
| 8,371,371 | B2 | 2/2013 | Diehl et al. |
| 8,453,739 | B2 | 6/2013 | Parsche |
| 8,648,760 | B2 | 2/2014 | Parsche |
| 8,763,691 | B2 | 7/2014 | Parsche |
| 8,763,692 | B2 | 7/2014 | Parsche |
| 8,772,683 | B2 | 7/2014 | Parsche |
| 8,789,599 | B2 | 7/2014 | Parsche |
| 8,836,594 | B2 | 9/2014 | Rothwell et al. |
| 9,016,367 | B2 | 4/2015 | Wright et al. |
| 9,151,146 | B2 | 10/2015 | Rey-Bethbeder et al. |
| 9,222,343 | B2 | 10/2015 | Menard et al. |
| 9,376,899 | B2 | 6/2016 | Wright et al. |
| 10,165,630 | B2 | 12/2018 | Okoniewski et al. |
| 10,760,392 | B2 | 9/2020 | Okoniewski et al. |
| 11,008,841 | B2 | 5/2021 | Apperley et al. |
| 2008/0073079 | A1 | 3/2008 | Tranquilla et al. |
| 2011/0146968 | A1 | 6/2011 | Diehl |
| 2011/0146981 | A1 | 6/2011 | Diehl |
| 2011/0303423 | A1 | 12/2011 | Kaminsky et al. |
| 2012/0067580 | A1 | 3/2012 | Parsche |
| 2012/0118565 | A1 | 5/2012 | Trautman et al. |
| 2012/0305239 | A1 | 12/2012 | Sultenfuss et al. |
| 2012/0318498 | A1* | 12/2012 | Parsche ................... E21B 43/14 166/57 |
| 2012/0318598 | A1 | 12/2012 | Parsche |
| 2013/0180729 | A1 | 7/2013 | Wright et al. |
| 2013/0192825 | A1 | 8/2013 | Parsche |
| 2013/0277045 | A1 | 10/2013 | Parsche |
| 2013/0334205 | A1 | 12/2013 | Wright et al. |
| 2014/0110395 | A1 | 4/2014 | Parsche |
| 2014/0131032 | A1 | 5/2014 | Dittmer |
| 2014/0224472 | A1* | 8/2014 | Parsche ............... E21B 43/2401 166/60 |
| 2014/0262222 | A1 | 9/2014 | Wright et al. |
| 2014/0262224 | A1 | 9/2014 | Ayers et al. |
| 2014/0262225 | A1 | 9/2014 | Campbell et al. |
| 2014/0266951 | A1 | 9/2014 | Okoniewski et al. |
| 2014/0290934 | A1 | 10/2014 | Parsche |
| 2014/0300520 | A1 | 10/2014 | Nguyen et al. |
| 2015/0192004 | A1 | 7/2015 | Saeedfar |
| 2015/0322759 | A1 | 11/2015 | Okoniewski et al. |
| 2016/0047213 | A1 | 2/2016 | Grounds, III et al. |
| 2016/0168977 | A1 | 6/2016 | Donderici et al. |
| 2019/0017360 | A1 | 1/2019 | Wheeler et al. |
| 2019/0145235 | A1* | 5/2019 | Okoniewski ............. H05B 6/62 166/248 |
| 2020/0173265 | A1 | 6/2020 | Okoniewski et al. |

FOREIGN PATENT DOCUMENTS

| | | | |
|---|---|---|---|
| CA | 2881763 | C | 8/2016 |
| CA | 2816297 | C | 5/2017 |
| EP | 1779938 | A2 | 5/2007 |
| WO | 2009/049358 | A1 | 4/2009 |
| WO | 2012/067769 | A2 | 5/2012 |
| WO | 2012/067770 | A1 | 5/2012 |
| WO | 2015/128497 | A1 | 9/2015 |
| WO | 2016/024197 | A2 | 2/2016 |
| WO | 2016/024198 | A2 | 2/2016 |
| WO | 2016/054734 | A1 | 4/2016 |
| WO | 2017/177319 | A1 | 10/2017 |

OTHER PUBLICATIONS

Pauli et al., "Impedance Matching of a Coaxial Antenna for Microwave In-situ Processing of Polluted Soils", retrieved from Journal of Microwave Power and Electromagnetic Energy, 45(2), 2011, pp. 70-78.

Pauli et al., "A dielectric traveling wave antenna for microwave assisted soil remediation", Mediterranean Microwave Symposium, Budapest, Hungary, 2007.

Sresty et al., "Recovery of Bitumen from Tar Sand Deposits with the Radio Frequency Process," SPE 10229, Reservor Engineering, 1986, p. 85-94.

Sutinjo et al., "Radiation from Fast and Slow Traveling Waves", IEEE Antennas Propag., 2008, 50(4): 175-181.

Koolman et al., "Electromagnetic Heating Method to Improve Steam Assisted Gravity Drainage", Paper presented at the International Thermal Operations and Heavy Oil Symposium, Calgary, Alberta, Canada, Oct. 2008, pp. 1-12 <https://doi.org/10.2118/117481-MS>.

* cited by examiner

MULTILATERAL OPEN TRANSMISSION LINES FOR ELECTROMAGNETIC HEATING AND METHOD OF USE

CROSS-REFERENCE TO RELATED APPLICATION

This application is a continuation of U.S. patent application Ser. No. 17/431,983, filed Aug. 18, 2021, now U.S. Pat. No. 11,729,870, which is a 35 USC § 371 national stage entry of International Patent Application No. PCT/CA2020/050279, filed Mar. 2, 2020, which claims priority from U.S. Provisional Patent Application Ser. No. 62/814,389, filed Mar. 6, 2019, the entire contents of each of which are hereby incorporated by reference.

FIELD

The embodiments described herein relate to electromagnetically heating hydrocarbon formations, and in particular to apparatus and methods of providing transmission line conductors for systems that electromagnetically heat hydrocarbon formations.

BACKGROUND

Electromagnetic (EM) heating can be used for enhanced recovery of hydrocarbons from underground reservoirs. Similar to traditional steam-based technologies, the application of EM energy to heat hydrocarbon formations can reduce viscosity and mobilize bitumen and heavy oil within the hydrocarbon formation for production. Hydrocarbon formations can include heavy oil formations, oil sands, tar sands, carbonate formations, shale oil formations, and any other hydrocarbon bearing formations, or any other mineral.

EM heating of hydrocarbon formations can be achieved by using an EM radiator, or antenna, applicator, or lossy transmission line positioned inside an underground reservoir to radiate, or couple, EM energy to the hydrocarbon formation. A producer well is typically located below or at the bottom of the underground reservoir to collect the heated oil, which drains mainly by gravity.

Due to characteristics of the hydrocarbon formation as well as the energy radiated from the EM radiator, the hydrocarbon formation may be heated non-uniformly, that is non-homogeneously, along the length of the EM radiator. However, non-uniform heating can result in local overheating when portions of the hydrocarbon formation are heated without further energy production. Such heating without production reduces the efficiency of the system. Furthermore, heating the overburden above the hydrocarbon formation or the underburden below the hydrocarbon formation does not yield oil production and results in additional inefficiencies.

SUMMARY

The various embodiments described herein generally relate to apparatus (and associated methods to provide the apparatus) for electromagnetic heating of an underground hydrocarbon formation. The apparatus can include an electrical power source; at least one electromagnetic wave generator for generating alternating current, the at least one electromagnetic wave generator being powered by the electrical power source; at least two transmission line conductors positioned in the hydrocarbon formation, the transmission line conductors coupled at a proximal end to the at least one electromagnetic wave generator, the transmission line conductors being excitable by the alternating current to propagate a travelling wave within the hydrocarbon formation, at least a portion of each of the transmission line conductors extend along a longitudinal axis, at least one of the transmission line conductors include a primary arm and at least one secondary arm extending laterally from the primary arm, the at least one secondary arm including at least one electrically isolatable connection for electrically isolating at least a portion of the secondary arm; at least one waveguide for carrying the alternating current from the at least one electromagnetic wave generator to the at least two transmission line conductors; and a producer well having a length that defines the longitudinal axis, the producer well being positioned laterally between the transmission line conductors and at a greater depth underground than at least one of the transmission line conductors to receive heated hydrocarbons from the hydrocarbon formation via gravity.

In any embodiment, an electrically isolatable connection can be located at a junction between the primary arm and a secondary arm of the at least one secondary arm.

In any embodiment, the secondary arm can have a length that is substantial relative to the wavelength of the alternating current propagating in the hydrocarbon formation.

In any embodiment, the secondary arm can have a length of at least $1/16^{th}$ of the wavelength of the alternating current propagating in the hydrocarbon formation.

In any embodiment, a secondary arm of the at least one secondary arm can include a plurality of segments connected in end-to-end relation by electrically isolatable connections.

In any embodiment, each segment can have a length that is substantially shorter in length than a quarter of the wavelength of the alternating current propagating in the hydrocarbon formation.

In any embodiment, the at least one electrically isolatable connection can include electrical insulation.

In any embodiment, the electrical insulation can include at least one of the group consisting of fiberglass, ceramic, zirconia, alumina, silicon nitride, and a polymer plastic.

In any embodiment, the at least one electrically isolatable connection can include at least one electrical switch for electrically connecting the at least a portion of the secondary arm.

In any embodiment, the at least one electrical switch can be remotely controllable above ground.

In any embodiment, control of the at least one electrical switch can be automated.

In any embodiment, the producer well can include a primary producer arm and at least one secondary producer arm extending laterally from the primary producer arm.

In any embodiment, the at least one secondary arm can include a plurality of secondary arms, the plurality of secondary arms may be positioned along the length of the primary arm, and each of the plurality of secondary arms may extend in a same direction from the primary arm.

In any embodiment, the at least one secondary arm can include a plurality of secondary arms, the plurality of secondary arms being positioned along the length of the primary arm, a first group of the plurality of secondary arms extending in a first direction from the primary arm and at least a second group of the plurality of secondary arms extending in a second direction from the primary arm, the second direction having a different angle with respect to the primary arm than the first direction.

In any embodiment, the at least one secondary arm can include a plurality of secondary arms, the plurality of secondary arms being positioned around the primary arm and extending along the longitudinal axis to form a cylinder shape around the primary arm.

In any embodiment, a shape of the primary arm along the longitudinal axis can include at least one crest.

In a broad aspect, the method can include providing electrical power to at least one electromagnetic wave generator for generating alternating current; positioning at least two transmission line conductors in the hydrocarbon formation, at least a portion of each of the transmission line conductors extend along a longitudinal axis, at least one of the transmission line conductors include a primary arm and at least one secondary arm extending laterally from the primary arm, at least a portion of the at least one secondary arm being electrically isolatable; positioning a producer well laterally between the transmission line conductors and at a greater depth underground than at least one of the transmission line conductors to receive heated hydrocarbons from the hydrocarbon formation via gravity, the producer well having a length that define a longitudinal axis; providing at least one waveguide, each of the at least one waveguide having a proximal end and a distal end; connecting the at least one proximal end of the at least one waveguide to the at least one electromagnetic wave generator; connecting the at least one distal end of the at least one waveguide to at least one of the transmission line conductors; using the at least one electromagnetic wave generator to generate alternating current; and applying the alternating current to excite the transmission line conductors, the excitation of the transmission line conductors being capable of propagating a travelling wave within the hydrocarbon formation and generating an electromagnetic field.

In any embodiment, the method can further involve electrically isolating at least a portion of a secondary arm of the at least one secondary arm to operate the secondary arm passively.

In any embodiment, a secondary arm of the at least one secondary arm can include a plurality of segments connected in end-to-end relation by electrically isolatable connections; the plurality of segments can include a first segment and a second segment that is adjacent and distal to the first segment; and electrically isolating at least a portion of the secondary arm to operate the secondary arm passively can involve: when the first segment and the second segment are electrically connected, electrically isolating the second segment to operate the second segment passively and the first segment actively; and electrically isolating the first segment to operate the first segment and the second segment passively.

In any embodiment, the method can further involve electrically connecting at least a portion of the secondary arm to operate the secondary arm actively.

In any embodiment, a secondary arm of the at least one secondary arm can include a plurality of segments connected in end-to-end relation by electrically isolatable connections; the plurality of segments include a first segment and a second segment that is adjacent and distal to the first segment; and electrically connecting at least a portion of the secondary arm to operate the second arm actively can involve: when the first segment and the second segment are electrically isolated, electrically connecting the first segment to operate the first segment actively and the second segment passively; and electrically connecting the second segment to operate the first segment and the second segment actively.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
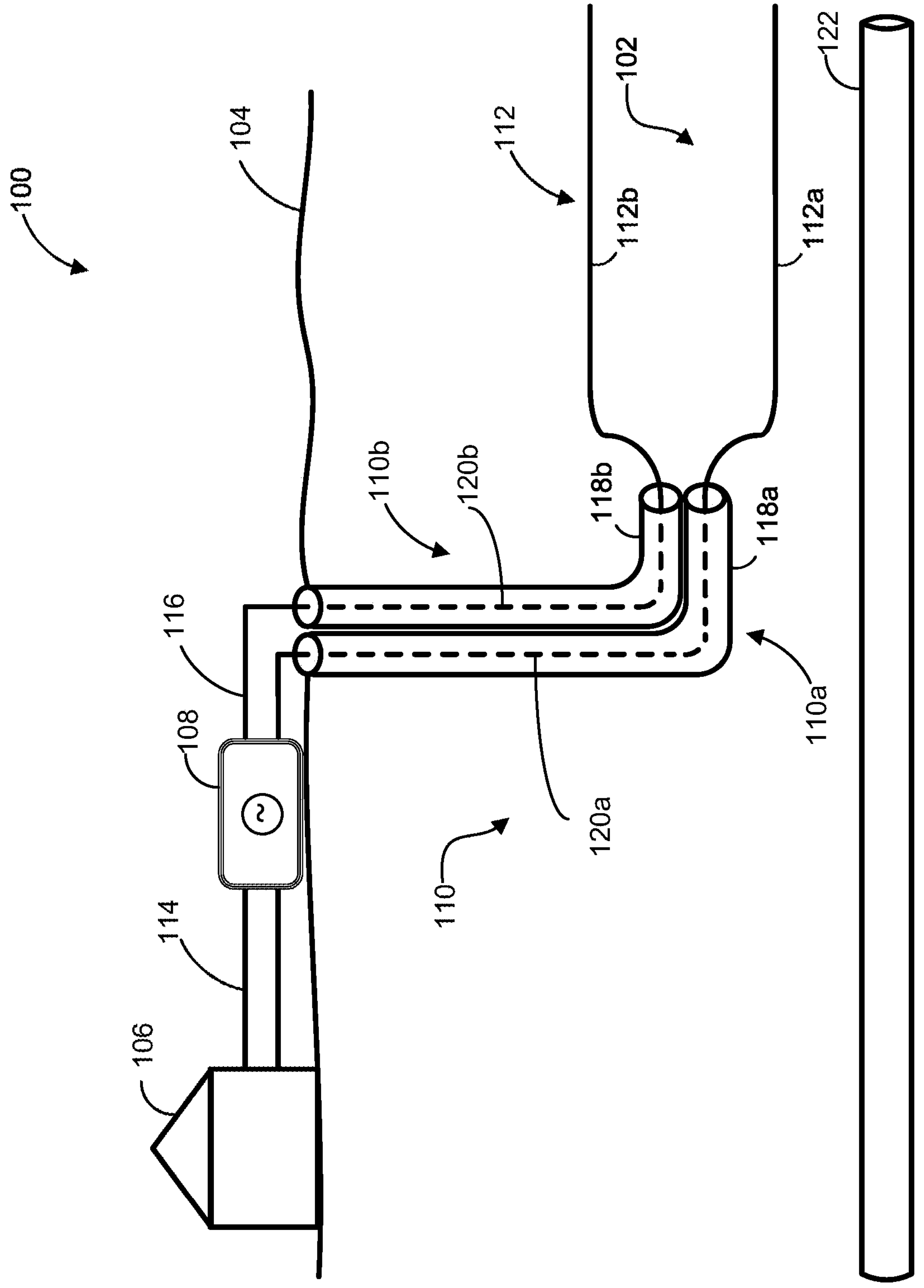
FIG. 1 is profile view of an apparatus for electromagnetic heating of formations according to at least one embodiment.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The term radio frequency when used herein is intended to extend beyond the conventional meaning of radio frequency. The term radio frequency is considered here to include frequencies at which physical dimensions of system components are comparable to the wavelength of the EM wave. System components that are less than approximately 10 wavelengths in length can be considered comparable to the wavelength. For example, a 1 kilometer (km) long underground system that uses EM energy to heat underground formations and operates at 50 kilohertz (kHz) will have physical dimensions that are comparable to the wavelength. If the underground formation has significant water content (herein referred to as "wet") (e.g., relative electrical permittivity being approximately 60 and conductivity being approximately 0.002 S/m), the EM wavelength at 50 kHz is 303 meters. The length of the 1 km long radiator is approximately 3.3 wavelengths. If the underground formation is dry (e.g., relative electrical permittivity being approximately 6 and conductivity being approximately 3E-7 S/m), the EM wavelength at 50 kHz is 2450 meters. The length of the radiator is then approximately 0.4 wavelengths. Therefore in both wet and dry scenarios, the length of the radiator is comparable to the wavelength. Accordingly, effects typically seen in conventional RF systems will be present and while 50 kHz is not typically considered RF frequency, this system is considered to be an RF system.

Referring to FIG. 1, shown therein is a profile view of an apparatus 100 for electromagnetic heating of hydrocarbon formations according to at least one embodiment. The apparatus 100 can be used for electromagnetic heating of a hydrocarbon formation 102. The apparatus 100 includes an electrical power source 106, an electromagnetic (EM) wave generator 108, a waveguide portion 110, and transmission line conductor portion 112. FIG. 1 is provided for illustration purposes only and other configurations are possible.

As shown in FIG. 1, the electrical power source 106 and the electromagnetic wave generator 108 can be located at the surface 104. In at least one embodiment, any one or both of the electrical power source 106 and the electromagnetic wave generator 108 can be located below ground.

The electrical power source 106 generates electrical power. The electrical power source 106 can be any appropriate source of electrical power, such as a stand-alone electric generator or an electrical grid. The electrical power may be one of alternating current (AC) or direct current (DC). Power cables 114 carry the electrical power from the electrical power source 106 to the EM wave generator 108.

The EM wave generator 108 generates EM power. It will be understood that EM power can be high frequency alternating current, alternating voltage, current waves, or voltage waves. The EM power can be a periodic high frequency signal having a fundamental frequency ($f_0$). The high frequency signal can have a sinusoidal waveform, square waveform, or any other appropriate shape. The high frequency signal can further include harmonics of the fundamental frequency. For example, the high frequency signal can include second harmonic $2f_0$, and third harmonic $3f_0$ of the fundamental frequency $f_0$. In some embodiments, the EM wave generator 108 can produce more than one frequency at a time. In some embodiments, the frequency and shape of the high frequency signal may change over time. The term "high frequency alternating current", as used herein, broadly refers to a periodic, high frequency EM power signal, which in some embodiments, can be a voltage signal.

As noted above, in some embodiments, the EM wave generator 108 can be located underground. An apparatus with the EM wave generator 108 located above ground rather than underground can be easier to deploy. However, when the EM wave generator 108 is located underground, transmission losses are reduced because EM energy is not dissipated in the areas that do not produce hydrocarbons (i.e., distance between the EM wave generator 108 and the transmission line conductor portion 112).

The waveguide portion 110 can carry high frequency alternating current from the EM wave generator 108 to the transmission line conductors **112*a* and 112*b*. Each of the transmission line conductors 112*a* and 112*b* can be coupled to the EM wave generator 108 via individual waveguides 110*a* and 110*b*. As shown in FIG. 1, the waveguides 110*a* and 110*b* can be collectively referred to as the waveguide portion 110. Each of the waveguides 110*a* and 110*b* can have a proximal end and a distal end. The proximal ends of the waveguides can be connected to the EM wave generator 108 via high frequency connectors 116. The distal ends of the waveguides 110***a* and 110*b* can be connected to the transmission line conductors 112*a* and 112*b*.

Each waveguide 110*a* and 110*b* can be provided by a coaxial transmission line having an outer conductor 118*a* and 118*b* and an inner conductor 120*a* and 120*b*, respectively. In some embodiments, each of the waveguides 110*a* and 110*b* can be provided by a metal casing pipe as the outer conductor and the metal casings concentrically surrounding pipes, cables, wires, or conductor rods, as the inner conductors. In some embodiments, the outer conductors 118*a* and 118*b* can be positioned within at least one additional casing pipe along at least part of the length of the waveguide portion 110.

The transmission line conductor portion 112 can be coupled to the EM wave generator 108 via the waveguide portion 110. As shown in FIG. 1, the transmission line conductors 112*a* and 112*b* may be collectively referred to as the transmission line conductor portion 112. According to some embodiments, additional transmission line conductors 112 may be included.

Each of the transmission line conductors 112*a* and 112*b* can be defined by a pipe. In some embodiments, the apparatus may include more than two transmission line conductors. In some embodiments, only one or none of the transmission line conductors may be defined by a pipe. In some embodiments, the transmission line conductors 112*a* and 112*b* may be conductor rods, coiled tubing, or coaxial cables, or any other pipe to transmit EM energy from EM wave generator 108.

The transmission line conductors 112*a* and 112*b* have a proximal end and a distal end. The proximal end of the transmission line conductors 112*a* and 112*b* can be coupled to the EM wave generator 108, via the waveguide portion 110. The transmission line conductors 112*a* and 112*b* can be excited by the high frequency alternating current generated by the EM wave generator 108. When excited, the transmission line conductors 112*a* and 112*b* can form an open transmission line between transmission line conductors 112*a* and 112*b*. The open transmission line can carry EM energy in a cross-section of a radius comparable to a wavelength of the excitation. The open transmission line can propagate an EM wave from the proximal end of the transmission line conductors 112*a* and 112*b* to the distal end of the transmission line conductors 112*a* and 112*b*. In at least one embodiment, the EM wave may propagate as a standing wave. In at least one other embodiment, the electromagnetic wave may propagate as a partially standing wave. In yet at least one other embodiment, the electromagnetic wave may propagate as a travelling wave.

The hydrocarbon formation 102 between the transmission line conductors 112*a* and 112*b* can act as a dielectric medium for the open transmission line. The open transmission line can carry and dissipate energy within the dielectric medium, that is, the hydrocarbon formation 102. The open transmission line formed by transmission line conductors and carrying EM energy within the hydrocarbon formation 102 can be considered a "dynamic transmission line". By propagating an EM wave from the proximal end of the transmission line conductors 112*a* and 112*b* to the distal end of the transmission line conductors 112*a* and 112*b*, the dynamic transmission line can carry EM energy within long well bores. Well bores spanning a length of 500 meters (m) to 1500 meters (m) can be considered long.

Producer well 122 is located at or near the bottom of the underground reservoir to receive heated oil released from the hydrocarbon formation 102 by the EM heating process. The heated oil drains mainly by gravity to the producer well 122. As shown in FIG. 1, producer well 122 is substantially horizontal (i.e., parallel to the surface). Producer well 122, or a vertical projection of the producer well 122, can define a longitudinal axis along which the transmission line conductors 112*a* and 112*b* extend. Typically, the producer well 122 is located at the same depth or at a greater depth than at least one of the transmission line conductors 112*a*, 112*b* of the open transmission line 112. In some embodiments, the producer well 122 can be located above the transmission line conductors 112*a*, 112*b* of the open transmission line 112. The producer well 122 is typically positioned in between the transmission line conductors 112*a*, 112*b*, including being centered between the transmission line conductors 112*a*, 112*b* or with any appropriate offset from a center of the transmission line conductors 112*a*, 112*b*. In some applications, it can be advantageous to position the producer well 122 closer to a first transmission line conductors than a second transmission line conductor so that the region closer to the first transmission line conductor is heated faster, contributing to early onset of oil production.

As the hydrocarbon formation 102 is heated, steam is also released and displaces the heated oil that has drained to and is collected in the producer well 122. The steam can accumulate in a steam chamber above the producer well 122. Direct contact between the steam chamber and the producer well 122 can result in a drop in system pressure, which increases steam and water production but reduces oil production. It is advantageous to maintain separation between the steam chamber and the producer well 122 for as long as possible.

The open transmission line is well suited to produce wide and flat heated areas. The heated area can be made arbitrarily wide by adjusting the separation between the transmission line conductors 112*a* and 112*b*. However, the hydrocarbon formation 102 between the transmission line conductors 112*a* and 112*b* may not be heated uniformly until the whole hydrocarbon formation 102 between the transmission line conductors 112*a* and 112*b* is desiccated. Regions closer to the transmission line conductors 112*a* and 112*b* are heated much more strongly than the regions further from the transmission line conductors 112*a* and 112*b*, including the region between the transmission line conductors 112*a* and 112*b*.

Underground reservoir simulations indicate that heating a wide, flat and uniform area approximately 2 meters to 8 meters above the producer well 122 can create a steam chamber that is more favorable than when the heated area is narrow, even if the total EM power used for heating is the same. A distance of approximately 8 meters to 40 meters can be considered wide. In contrast, a distance of approximately less than 8 meters can be considered narrow. A more favorable steam chamber is a chamber which stays 'disconnected' (i.e., remains separated) from the producer well 122 for a longer period of time. However, although a wide heating area creates a more favorable steam chamber that stays 'disconnected' for a longer period of time, it also delays the initial onset of oil production.

In some applications, it can be advantageous for the distance between the transmission line conductors 112*a* and 112*b* to be narrow during a first stage (e.g., several years) of the heating process to encourage early onset of oil production. During a second stage of the heating process, it can be advantageous for the distance between transmission line conductors 112*a* and 112*b* to be wide to continue oil production by maintaining a separation between the producer well 122 and the steam chamber (i.e., maintaining a disconnected steam chamber).

It is also preferable to produce as much as economically viable from the underground reservoir. This can be achieved by producing heat laterally far from the open transmission line, while minimizing heating of the under-burden (i.e., region below the underground reservoir) and/or over-burden layers (i.e., region above the underground reservoir). Heating of the under-burden and/or over-burden does not generally result in oil production, and therefore represents radiation losses.

Figure 2:
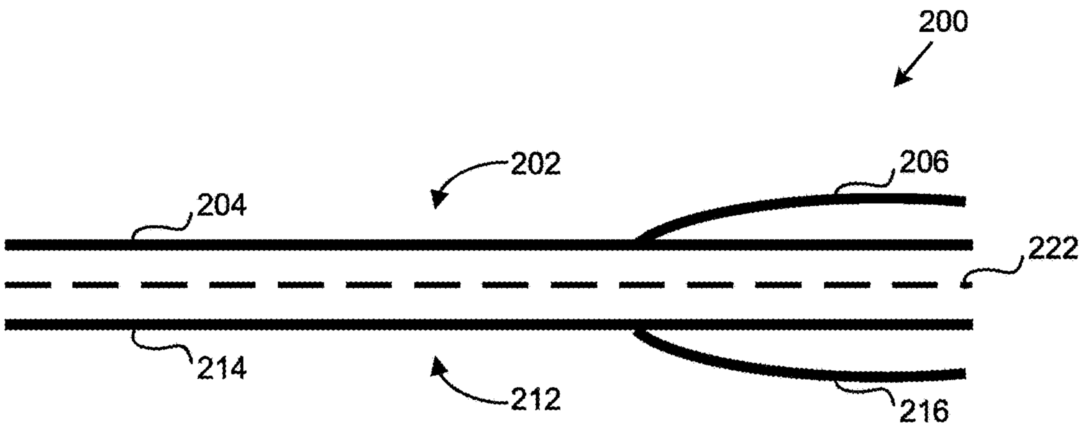
FIG. 2 is a schematic top view of a multilateral open transmission line, in accordance with at least one embodiment.

Referring to FIG. 2, shown therein is a schematic top view of a multilateral open transmission line, according to at least one embodiment. The open transmission line 200 includes a first transmission line conductor 202 and a second transmission line conductor 212. As shown in FIG. 2 is a producer well 222 positioned laterally between the transmission line conductors 202 and 212.

As shown in FIG. 2, each of the first transmission line conductor 202 and the second transmission line conductor 212 are multilateral transmission line conductors. That is, the first transmission line conductor 202 includes a primary arm 204 and a secondary arm 206 extending laterally from the primary arm 202. Similarly, the second transmission line conductor 212 includes a primary arm 214 and a secondary arm 216 extending laterally from the primary arm 214.

As can be seen in FIG. 2, secondary arms 206 and 216 have a proximal portion that attaches to a point along the primary arms 204 and 214 and a distal portion that generally extends along the longitudinal axis defined by the producer well, similar to the primary arm 204 and 214. That is, the distal portion of the secondary arms 206, 216 are generally parallel to the primary arms 204, 214. The proximal portion of the secondary arms 206, 216 can be curved to connect to the primary arm 204, 214 and the distal portion of the secondary arms 206, 216.

The secondary arms 206, 216 can have a length that is substantial relative to the wavelength of the alternating current propagating in the hydrocarbon formation. Secondary arms having any appropriate length can be used. For example, in at least one embodiment, the secondary arms 206, 216 can have a length of at least one sixteenth ($1/16^{th}$) of the wavelength of the alternating current propagating in the hydrocarbon formation. In another example, a secondary arm can have a length of at least one eighth ($1/8^{th}$) or at least one quarter ($1/4^{th}$) of the wavelength of the alternating current.

In at least one embodiment, the secondary arms 206, 216 can include at least one electrically isolatable connection (not shown in FIG. 2) for electrically isolating the secondary arm 206, 216 from the primary arm 204, 214 (herein referred to as "passive" operation of the secondary arm 206, 216). In at least one embodiment, the at least one electrically isolatable connection can be located at a junction between the primary arm 204, 214 and the secondary arm 206, 216. In at least one embodiment, the at least one electrically isolatable connection can be located along the length of the secondary arm 206, 216.

The at least one electrically isolatable connection can be provided by electrical insulation or a dielectric. For example, the electrical insulation can include at least one of the group consisting of fiberglass, ceramic, zirconia, alumina, silicon nitride, and a polymer plastic. Furthermore, the electrical insulation can be formed of pipes.

In at least one embodiment, the at least one electrically isolatable connection (not shown in FIG. 2) can also electrically connect at least a portion of the secondary arm 206, 216 to the primary arm 204, 214 (herein referred to as "active" operation of the secondary arm 206, 216). Such an electrically isolatable connection can be provided by one or more electrical switches. Electrical switches can include mechanical, electromechanical, electronic, and/or chemical (including explosive) switches. Furthermore, electrical switches can be remotely controllable above ground, that is, at the surface. Electrical switches can be manually operated by a user or automated.

It should be noted that an electrically isolatable connection can be provided by both electrical insulation and one or more switches. In such cases, the electrical insulation can electrically isolate the one or more switches from the surrounding hydrocarbon formation.

When a secondary arm 206, 216 is electrically connected to a primary arm 204, 214, the secondary arm 206, 216 is said to be "active" because it is also excited by the high frequency alternating current that excites the primary arm 204, 214. Thus, multilateral open transmission lines having a primary arm 204, 214 and at least one secondary arm 206, 216 can create larger heated areas than the primary arm 204, 214 alone.

Furthermore, multilateral open transmission lines can achieve a larger penetration into the hydrocarbon formation. For example, open transmission lines (i.e., transmission line conductors having primary arms only) typically have electrical opens (i.e., open circuits) at the distal end of the open transmission line. As a result, electric fields at the distal end of the open transmission line can be strong. Provision of secondary arms at the distal end of the open transmission line can utilize the strong electric fields at the distal end of the open transmission line to achieve a larger penetration into the hydrocarbon formation.

When the secondary arm 206, 216 is electrically isolated from the primary arm 204, 214, that is, when the secondary arm 206, 216 is "passive", the effect of the passive secondary arm 206, 216 can depend on the hydrocarbon formation. For example, when the hydrocarbon formation is wet and the secondary arm 206, 216 is sufficiently spaced from the primary arm 204, 214, the passive secondary arm 206, 216 can have a substantially smaller electromagnetic field strength than the primary arm 204, 214 and thus, not affect the electromagnetic heating process of the primary arm 204, 214. In at least one embodiment, an electromagnetic field strength difference of at least 6 decibels (dB) can be considered to be significantly smaller.

When the hydrocarbon formation around the primary arms 204, 214 is desiccated but the hydrocarbon formation around the secondary arms 206, 216 remain wet, the passive secondary arms 206, 216 can block the radiation from spreading laterally into the hydrocarbon formation and can constrain the radiation to the area between the primary arms 204, 214. If the producer well is located between the primary arms 204, 214, energy is focused on the hydrocarbon formation near the producer well, which can be advantageous for early onset of oil production.

When the hydrocarbon formation around the secondary arms 206, 216 is also desiccated, a steam chamber has developed, with the potential to come into contact with the producer well. The secondary arm 206, 216 can be electrically connected to operate as active secondary arms 206, 216 and spread the radiation laterally, which increases the heating area for a more favourable steam chamber and reduces radiation loss in the overburden and underburden.

FIG. 2 is provided for illustration purposes only and other configurations are possible. For example, the open transmission line 200 can include any number of additional transmission line conductors. In addition, although the first transmission line conductor 202 and the second transmission line conductor 212 are each shown as being a multilateral transmission line conductor, in at least one embodiment, only one of the first transmission line conductor 202 and the second transmission line conductor 212 is a multilateral transmission line conductor.

As well, the secondary arm 206 of the first transmission line conductor 202 and the secondary arm 216 of the second transmission line conductor 212 are shown as having substantially similar length and shape. In at least one embodiment, the secondary arms 206, 216 of the first and second transmission line conductors 202, 212 differ in at least one of length and shape. For example, the angle or curvature at which the secondary arms 206, 216 extend laterally from the primary arms 204, 214 can be unequal.

In addition, each of the multilateral transmission line conductors 202, 212 are shown as having a single secondary arm 206, 216 extending laterally from the primary arms 204, 214. In at least one embodiment, a multilateral transmission line conductor can have a plurality of secondary arms that each extend laterally from a different point along the primary arm (i.e., multiple forks). In at least one embodiment, a multilateral transmission line conductor can have a plurality of secondary arms that are recursive branches (i.e., recursive forks). That is, a first secondary arm can extend from the primary arm and a second secondary arm can extend from the first secondary arm. It should be noted that the plurality of secondary arms can be both multiple forks at different points along the primary arm and recursive forks.

In addition, while the primary arms 204, 214 are each shown as being substantially straight, in at least one embodiment, at least one of the primary arms 204, 214 can have a shape along the longitudinal axis defined by the producer well that forms at least one crest. That is, at least on the primary arms 204, 214 can be undulating.

Wells for multilateral transmission line conductors 202, 204 can be formed using multilateral drilling and completion technology. Multilateral drilling and completion technology can be economical advantageous compared to drilling and completing multiple, separate wells. After the wells are drilled, multilateral transmission line conductors 202, 204 can be formed using lengths of tubing (i.e., joints).

Figure 3:
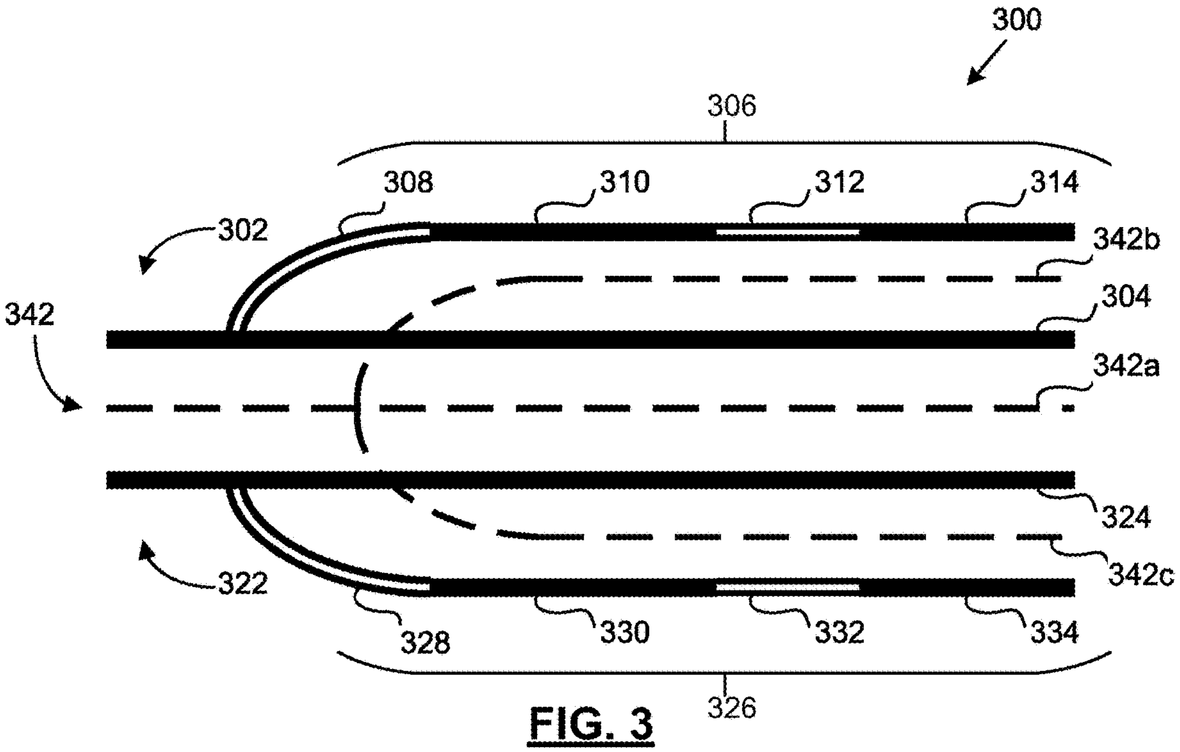
FIG. 3 is a schematic top view of another multilateral open transmission line, in accordance with at least one embodiment.

Referring to FIG. 3, shown therein is a schematic top view of another multilateral open transmission line, according to at least one embodiment. The multilateral open transmission line 300 includes a first transmission line conductor 302 and a second transmission line conductor 322. As shown in FIG. 3, each of the first transmission line conductor 302 and the second transmission line conductor 322 are multilateral transmission line conductors. Also shown in FIG. 3 is a producer well 342 positioned laterally between the transmission line conductors 302 and 322. Producer well 342 includes a primary arm 342*a* and two secondary arms 342*b*, 342*c*.

In particular, the first transmission line conductor 302 includes a primary arm 304 and a secondary arm 306 extending laterally from the primary arm 304. As shown in FIG. 3, the secondary arm 306 of the first transmission line conductor 302 is formed of a plurality of segments 308, 310, 312, and 314 connected in end-to-end relation. Similarly, the second transmission line conductor 312 includes a primary arm 314 and a secondary arm 326 extending laterally from the primary arm 314 that is formed of a plurality of segments 328, 330, 332, and 334 connected in end-to-end relation.

The electrically isolatable connections 308, 312, 328, and 332 can be positioned to segment the secondary arm 306, 326 to electrically conductive portions that are substantially shorter in length than the wavelength of the alternating current propagating in the hydrocarbon formation (i.e., the alternating current energizing the primary arms 204, 214). For example, each secondary arm segment 310, 314, 330, and 334 can have a length that is shorter than a quarter of the wavelength of the alternating current propagating in the hydrocarbon formation. By segmenting the secondary arms 306, 326 to portions that are substantially shorter than the wavelength of the alternating current propagating in the hydrocarbon formation (i.e., the alternating current energizing the primary arms), passive operation of the secondary arms 306, 326 can allow the secondary arms 306, 326 to be substantially transparent and not modify the electromagnetic heating pattern of the primary arms 304, 324.

In at least one embodiment, at least one of the electrically isolatable connections 308, 328 can be electrical insulation to electrically isolate the secondary arms 306, 326 and the primary arms 304, 324 and operate the secondary arms 306, 326 passively. Similarly, in at least one embodiment, at least one of the electrically isolatable connections 312 and 332 can be electrical insulation to electrically isolate secondary arm segments 310, 330, 314, 334.

In at least one embodiment, at least one of the electrically isolatable connections 308, 312, 328, and 332 can be one or more switches to operate successive secondary arms segments 310, 314, 330, and 334 passively or actively. By operating successive secondary arms segments 310, 314, 330, and 334 passively or actively, various heating patterns can be achieved along the length of the multilateral open transmission line 300. Furthermore, with a plurality of secondary arm segments 310, 314, 330, and 334, the secondary arm segments 310, 314, 330, and 334 can be connected or isolated individually, as a subset, or all together.

For example, particular secondary arm segments 310, 314, 330, and 334 can be operated actively to focus power on the hydrocarbon formation around those secondary arm segments 310, 314, 330, and 334 that have not been fully produced. In addition, particular secondary arm segments 310, 314, 330, and 334 can be disconnected and operated passively when the hydrocarbon formation around those secondary arm segments 310, 314, 330, and 334 that have been sufficiently produced.

In at least one embodiment, secondary arm segments at the distal or proximal end of the multilateral open transmission line can be disconnected or connected to shorten or lengthen the multilateral open transmission line. For example, secondary arm segments that are located at the distal end of the multilateral open transmission line can be disconnected to focus the radiation at the proximal end of the multilateral open transmission line. Conversely, secondary arm segments that are located at the proximal end of the multilateral open transmission line can be disconnected to focus the radiation at the distal end of the multilateral open transmission line.

In at least one embodiment, initially, secondary arm segments 310, 330 can be operated actively (i.e., connected) and secondary arm segments 314, 334 can be operated passively (i.e., disconnected) to focus power on the hydrocarbon formation around the proximal end of the multilateral open transmission line 300. Subsequently, secondary arm segments 314, 334 can be connected and also operated actively to penetrate the hydrocarbon formation around the distal end of the multilateral open transmission line 300. When additional secondary arm segments distal to secondary arm segments 314, 334 are provided, the additional secondary arm segments can be connected simultaneously with secondary arm segments 314, 334 or progressively after the secondary arm segments 314, 334 are connected.

FIG. 3 is provided for illustration purposes only and other configurations are possible. For example, the open transmission line 300 can include any number of additional transmission line conductors. In addition, although the first transmission line conductor 302 and the second transmission line conductor 322 are each shown as being a multilateral transmission line conductor, in at least one embodiment, only one of the first transmission line conductor 302 and the second transmission line conductor 322 is a multilateral transmission line conductor.

The secondary arm 306 of the first transmission line conductor 302 and the secondary arm 326 of the second transmission line conductor 322 are shown as having substantially similar length and shape. In at least one embodiment, the secondary arms 306, 326 of the first and second transmission line conductors 302, 322 differ in at least one of length and shape. For example, the angle or curvature at which the secondary arms 306, 326 extend laterally from the primary arms 304, 314 can be unequal.

In addition, each of the multilateral transmission line conductors 302, 322 are shown as having a single secondary arm 306, 326 extending laterally from the primary arms 304, 314. In at least one embodiment, the multilateral transmission line conductors 302, 322 can have a plurality of secondary arms that are multiple forks and/or recursive forks. Furthermore, any one or both of the primary arms 304, 314 can be undulating.

While both secondary arms 306, 326 of the first and second transmission line conductors 302, 322 are shown as being formed of four segments, the secondary arms 306, 326 can be formed of fewer or more segments. For example, in at least one embodiment, the secondary arm 306 of the first transmission line conductor 302 can be formed of three segments and the secondary arm 326 of the second transmission line conductor 322 can be formed of six segments. Furthermore, while both secondary arms 306, 326 of the first and second transmission line conductors 302, 322 are shown as being formed of a plurality of segments, in at least one embodiment, only one of the secondary arms 306, 326 is formed of a plurality of segments.

The electrically isolatable connections 308, 312, 328, and 332 are shown in FIG. 3 as having a length shorter than the length of the secondary arm segments 310, 314, 330, and 334. However, the electrically isolatable connections 308, 312, 328, and 332 can have any appropriate length.

Figures 4A, 4B, 4C, 4D:
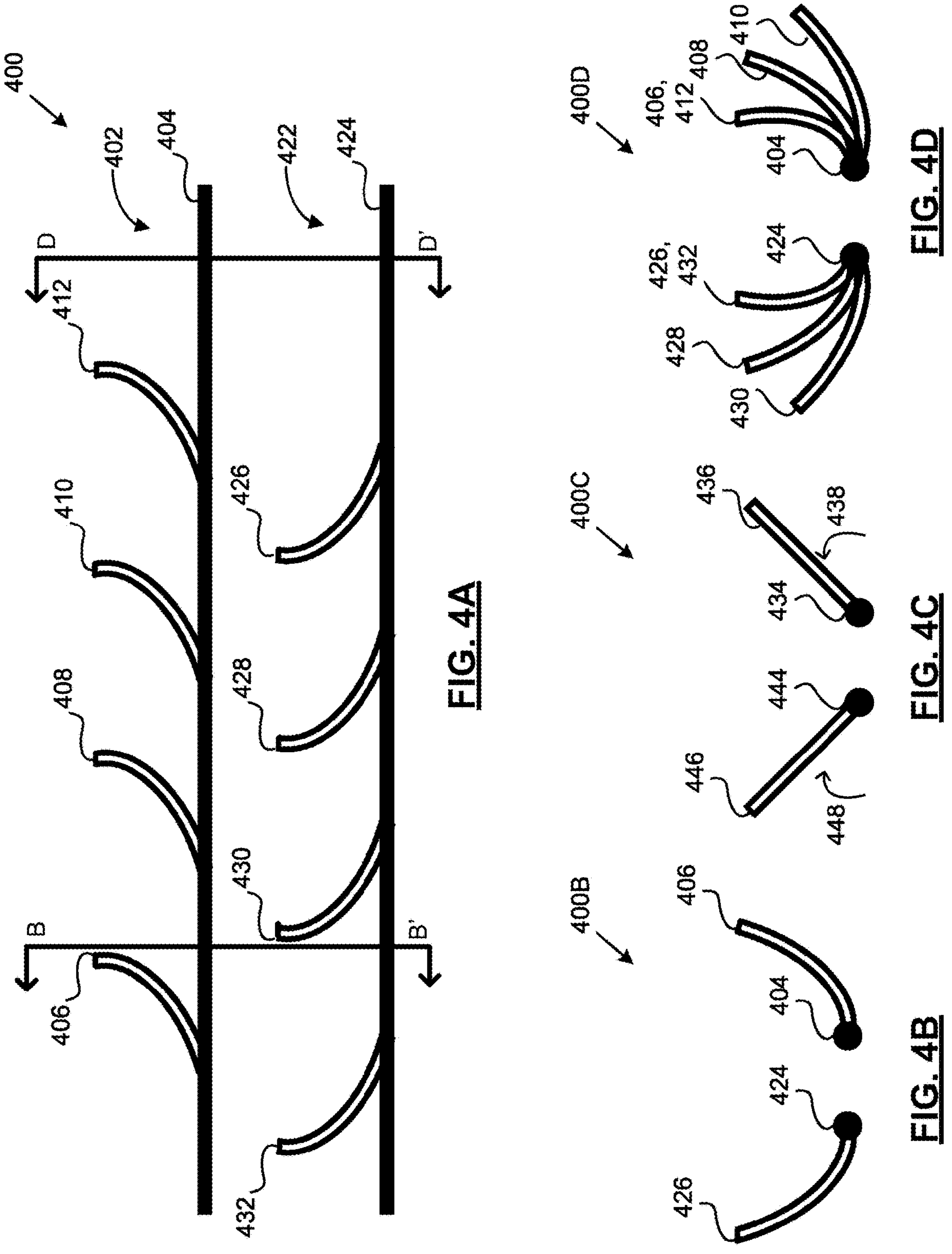
FIG. 4A is a schematic side view of another multilateral open transmission line, in accordance with at least one embodiment.
FIG. 4B is a schematic cross-sectional view of the multilateral open transmission line of FIG. 4A, in accordance with at least one embodiment.
FIG. 4C is another schematic cross-sectional view of a multilateral open transmission line, in accordance with at least another embodiment.
FIG. 4D is another schematic cross-sectional view of the multilateral open transmission line of FIG. 4A, in accordance with at least one embodiment.

Referring to FIG. 4A, shown therein is a schematic side view of another multilateral open transmission line, according to at least one embodiment. The open transmission line 400 includes a first transmission line conductor 402 and a second transmission line conductor 422. As shown in FIG. 4A, each of the first transmission line conductor 402 and the second transmission line conductor 422 are multilateral transmission line conductors.

In particular, the first transmission line conductor 402 includes a primary arm 404 and a plurality of secondary arms 406, 408, 410, 412 that are each positioned along the length of the primary arm 404 and extend laterally from the primary arm 404 (i.e., multiple forks). The second transmission line conductor 422 includes a primary arm 424 and a plurality of secondary arms 426, 428, 430, 432 that are each positioned along the length of the primary arm 424 and extend laterally from the primary arm 424 (i.e., multiple forks).

Referring to FIG. 4B, shown therein is a schematic cross-sectional view 400B of the multilateral open transmission line 400 of FIG. 4A at point B-B', according to at least one embodiment. As shown in FIG. 4B, the secondary arms 406, 426 can extend laterally from the primary arms 404, 424 to enlarge the perceived radius of each transmission line conductor 402, 422. By enlarging the radius of the transmission line conductors 402, 422, local overheating can be reduced, which aids further penetration into the hydrocarbon formation.

In at least one embodiment, secondary arms 408, 410, and 412 can generally extend in the same direction as secondary arm 406 and secondary arms 428, 430, and 432 can generally extend in the same direction as secondary arm 426. In such cases, the secondary arms 406, 408, 410, 412 can form a first wall shape and the secondary arms 426, 428, 430, 432 can form a second wall shape. Together, the secondary arms 406, 408, 410, 412, 426, 428, 430, 432 create large heated areas between the walls.

Referring to FIG. 4C, shown therein is a schematic cross-sectional view 400C of another multilateral open transmission line, according to at least another embodiment. Similar to the secondary arms 406, 426 of FIG. 4B, the secondary arms 436, 446 can extend laterally from the primary arms 434, 444 to enlarge the perceived radius of each transmission line conductor, reduce local overheating, and aid further penetration into the hydrocarbon formation. However, in contrast to the secondary arms 406, 426 of FIG. 4B that have a curvature, the secondary arms 436, 446 are substantially straight, or linear.

Furthermore, using a pitch, yaw, and roll coordinate system, each secondary arm 436, 446 can have a roll angle with respect to a horizontal plane defined by the primary arm 434, 444. For example, the secondary arm 436 is positioned having a roll angle 438 with respect to the primary arm 434 and the secondary arm 446 is positioned having a roll angle 448 with respect to the primary arm 444. The roll angle of each secondary arm 436, 446 can be any angle between 0° to ±180°. At a roll angle of 90° or −90°, the secondary arm 436, 446 can be approximately vertical. At a roll angle of 0° or ±180°, the secondary arm 436, 446 can be approximately horizontal.

In FIG. 4C, the magnitude of the roll angle 438 of the secondary arm 436 is approximately equal to the magnitude of the roll angle 448 of the secondary arm 446. In some embodiments, the magnitudes of the roll angles 438, 448 of the secondary arms 436, 446 are unequal. In FIG. 4C, the roll angle of the secondary arms 436, 446 are opposite. In some embodiments, the directions of the roll angle of the secondary arms 436, 446 are the same.

Referring to FIG. 4D, shown therein is a schematic cross-sectional view 400D of the multilateral open transmission line 400 of FIG. 4A at point D-D', according to at least one embodiment. As shown in FIG. 4D, the secondary arms 406, 408, 410, 412 can extend laterally from the primary arm 404 at different angles. As well, the secondary arms 426, 428, 430, 432 can extend laterally from the primary arm 424 at different angles. In such cases, the secondary arms 406, 408, 410, 412 can form a first tree shape and the secondary arms 426, 428, 430, 432 can form a second tree shape.

In at least one embodiment, a first group of secondary arms of a transmission line conductor, such as secondary arms 406 and 412 of transmission line conductor 402, extend in a first direction from the primary arm 404 and at least a second group of secondary arms of the same transmission line conductor, such as secondary arm 408, extend in a second direction from the primary arm 404. The second direction can have a different angle with respect to the primary arm 404 than the first direction.

Furthermore, as shown in FIG. 4D, the transmission line conductor 402 also has a third group of secondary arms, such as secondary arm 410, that extends a third direction from the primary arm 404, the third direction having a different angle with respect to the primary arm 404 than the first direction of the first group of secondary arms and the second direction of the second group of secondary arms. A transmission line conductor can include any number of groups of secondary arms, each group of secondary arms extending from the primary arm at a unique angle from the other groups of secondary arms. It should also be noted that secondary arms of a groups can be located beside one another or dispersed along the length of the transmission line conductor.

FIGS. 4A-4D are provided for illustration purposes only and other configurations are possible. For example, the open transmission line 400 can include any number of additional transmission line conductors. In addition, although the first and second transmission line conductors 402 and 422 are each shown as being a multilateral transmission line conductor and in particular, a multilateral transmission line conductor having multiple forks, in at least one embodiment, only one of the first and second transmission line conductors 402 and 422 is a multilateral transmission line conductor having any number of secondary arms. In at least one embodiment, only one of the first and second transmission line conductors 402 and 422 have multiple forks. In at least one embodiment, one or both of the first and second transmission line conductors 402 and 422 can include recursive forks. In at least one embodiment, one or both of the first and second transmission line conductors 402 and 422 include at least a secondary arm having a curvature and at least a secondary arm that is substantially straight. In at least one embodiment, only one of the first and second transmission line conductors 402 and 422 has a wall shape or a tree shape.

Figure 5A:
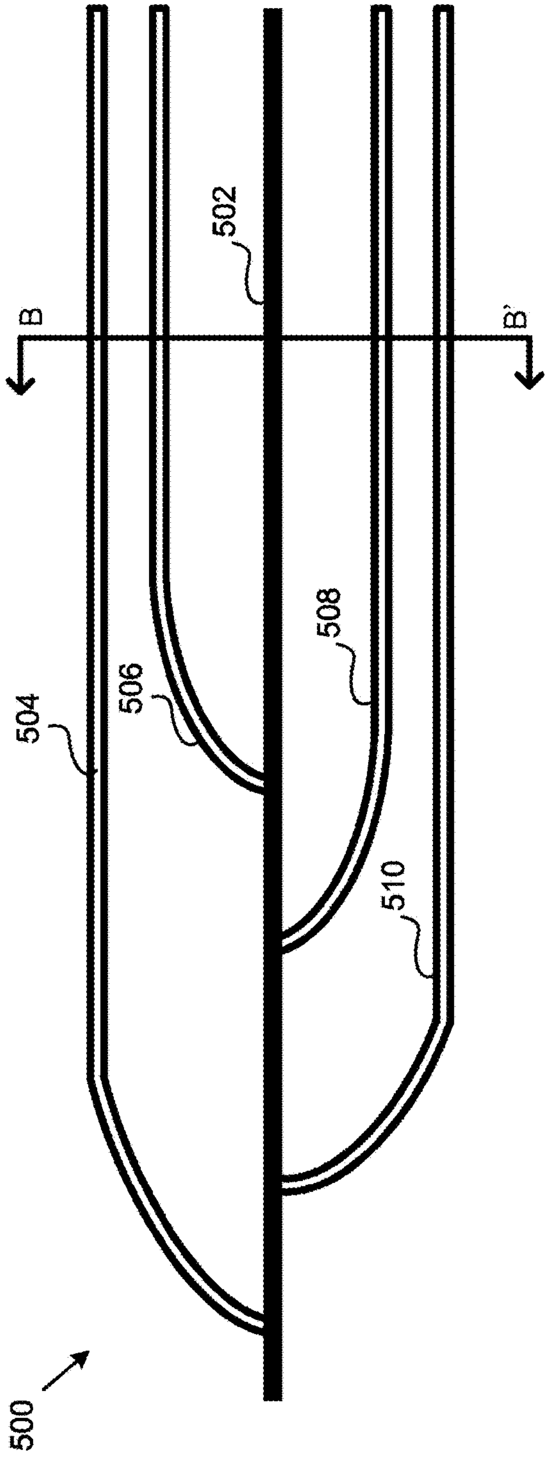
FIG. 5A is a schematic side view of a multilateral transmission line conductor, in accordance with at least one embodiment.

Referring to FIG. 5A, shown therein is a schematic side view of a multilateral transmission line conductor, according to at least one embodiment. The transmission line conductor 500 includes a primary arm 502 and a plurality of secondary arms 504, 506, 508, 510 that are each positioned along the length of the primary arm 502 and extend laterally from the primary arm 502 (i.e., multiple forks).

Figure 5B:
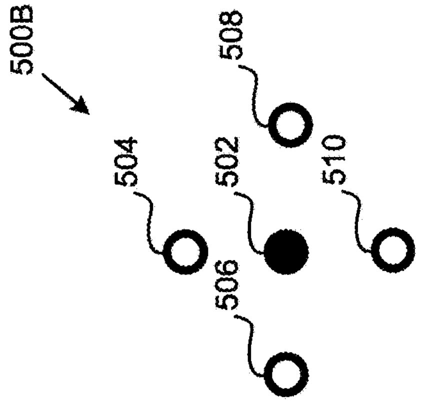
FIG. 5B is a schematic cross-sectional view of the multilateral open transmission line of FIG. 5A, in accordance with at least one embodiment.

Referring to FIG. 5B, shown therein is a schematic cross-sectional view 500B of the transmission line conductor 500 of FIG. 5A at point B-B', according to at least one embodiment. As shown in FIG. 5B, the secondary arms 504, 506, 508, 510 can extend laterally from the primary arm 502 at different angles to form a circular shape around the primary arm 502. Since the distal portion of the secondary arms 504, 506, 508, 510 extend along the longitudinal axis, as shown in FIG. 5A, the secondary arms 504, 506, 508, 510 further form a cylindrical shape around the primary arm 502.

Figure 5C:
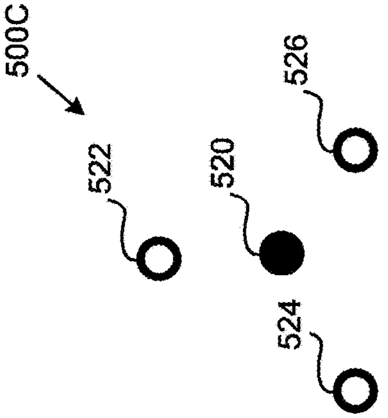
FIG. 5C is a schematic cross-sectional view of another multilateral open transmission line, in accordance with at least one embodiment.

Referring to FIG. 5C, shown therein is a schematic cross-sectional view 500C of another transmission line conductor, according to at least one embodiment. As shown in FIG. 5C, the secondary arms 522, 524, and 526 can extend laterally from the primary arm 520 at different angles to form a triangular shape. If the distal portion of the secondary arms 522, 524, and 526 extend along the longitudinal axis, similar to secondary arms 504, 506, 508, 510 of primary arm 502 in FIG. 5A, the secondary arms 522, 524, and 526 can further form a triangular prism shape around the primary arm 520.

FIGS. 5A-5C are provided for illustration purposes only and other configurations are possible. For example, the secondary arms 504, 506, 508, and 510 are positioned symmetrically around the primary arm 502 and the secondary arms 522, 524, and 526 are positioned symmetrically around the primary arm 520. That is, the distance between each secondary arm 504, 506, 508, and 510 and the primary arm 502 is approximately equal. Similarly, the distance between each secondary arm 522, 524, and 526 and the primary arm 520 is approximately equal as well. Furthermore, the distance between a secondary arm and each adjacent secondary arm is approximately equal. In at least one embodiment, the secondary arms 504, 506, 508, and 510 and 522, 524, and 526 can be positioned asymmetrically around the primary arms 502 and 520, respectively. For example, at least one secondary arm can be located closer to the primary arm than the other secondary arms. In another example, the distance between a pair of adjacent secondary arms can be less than the distance been any other pair of adjacent secondary arms.

Figure 6:
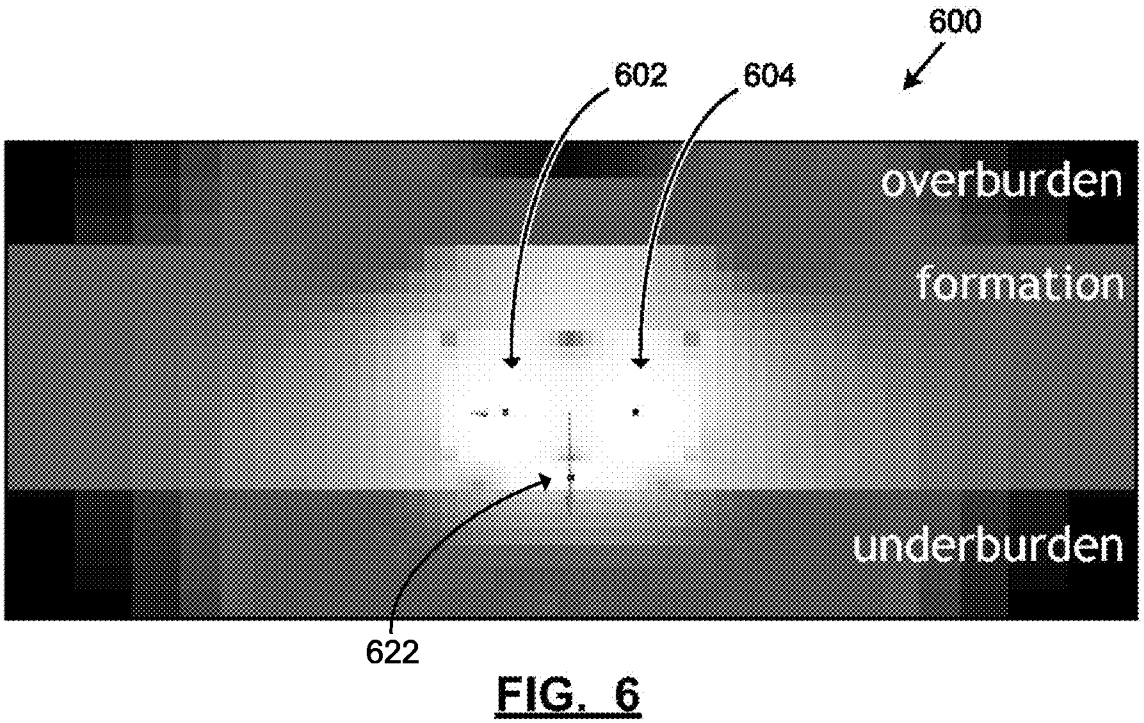
FIG. 6 is an illustration of a cross-sectional view of a radiation pattern generated by an open transmission line during early stages of electromagnetic heating, in accordance with at least one embodiment.

Referring to FIG. 6, shown therein is an illustration 600 of a cross-sectional view of a radiation pattern generated by an open transmission line positioned within a hydrocarbon formation, during early stages of electromagnetic heating. As shown in FIG. 6, the open transmission line includes two transmission line conductors 602, 604 that each have a single arm and without secondary arms extending from the single arm. The transmission line conductors 602, 604 can be approximately 1 kilometer (km) long and be spaced a distance of approximately 8 meters (m) apart. Also shown in FIG. 6 is a producer well 622 positioned laterally between the transmission line conductors 602 and 604.

The open transmission line is positioned within the hydrocarbon formation, below the overburden and above the underburden. As shown in FIG. 6, the radiation is concentrated in the areas immediately surrounding the transmission line conductors 602, 604. Thus, the areas immediately surrounding the transmission line conductors 602, 604 are heated and will become dessicated. Areas that are further away from the transmission line conductors 602, 604 are not heated and will remain wet.

Figure 7:
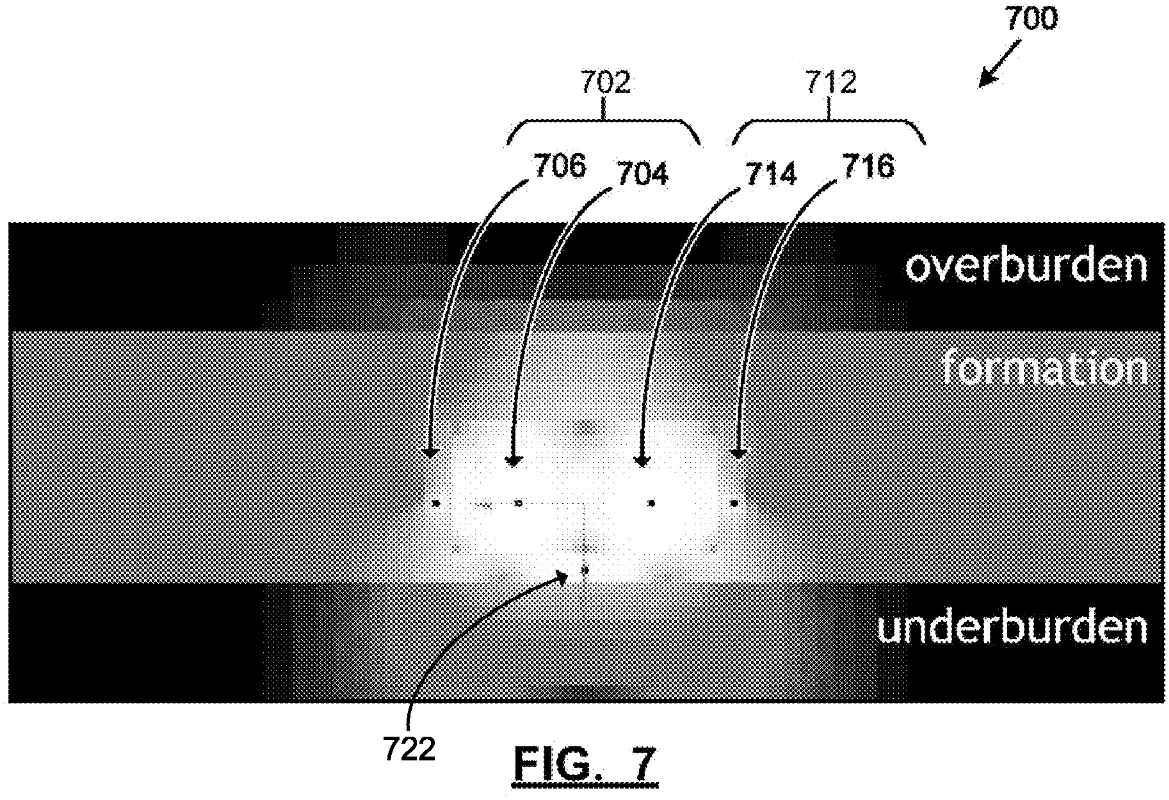
FIG. 7 is an illustration of a cross-sectional view of a radiation pattern generated by a multilateral open transmission line during early stages of electromagnetic heating, in accordance with at least one embodiment.

Referring to FIG. 7, shown therein is an illustration 700 of a cross-sectional view of a radiation pattern generated by a multilateral open transmission line, during early stages of electromagnetic heating, in accordance with at least one embodiment. As shown in FIG. 7, the multilateral open transmission line includes two multilateral transmission line conductors 702, 712. The multilateral open transmission line is positioned within the hydrocarbon formation, below the overburden and above the underburden. Also shown in FIG. 7 is a producer well 722 positioned laterally between the transmission line conductors 702 and 712.

Multilateral transmission line conductor 702 includes a primary arm 704 and a secondary arm 706. Similarly, multilateral transmission line conductor 712 includes a primary arm 714 and a secondary arm 716. The primary arms 704, 714 are approximately 1 kilometer (km) long and can be spaced a distance of approximately 8 meters (m) apart. The secondary arms 706, 716 are approximately 800 meters (m) long and are substantially parallel to the respective primary arm 704, 714 from which they extend laterally. Each of the secondary arms 706, 716 are spaced approximately 5 meters (m) apart from the respective primary arm 704, 714 from which they extend laterally.

In at least one embodiment, the secondary arms 706, 716 can be initially operated passively. Passive operation of the secondary arms 706, 716 results in concentration of the radiation in the areas immediately surrounding the primary arms 704, 714, similar to FIG. 6. Thus, the areas immediately surrounding the primary arms 704, 714, particularly the area between the primary arms 704, 714, are heated and will become dessicated. The area immediately surrounding the secondary arms 706, 716 will remain a wet zone, outside of the region dessicated by the primary arms 704, 714.

Furthermore, operation of the secondary arms 706, 716 passively in the early stages can block the radiation from spreading laterally into the wet hydrocarbon formation, constraining most of the radiation to be within the region between the passive secondary arms 706, 716. This effect can be beneficial at the early stages or first half of the EM heating process because it can concentrate power in the region between the passive secondary arms 706, 716, heating that region faster and resulting in earlier onset of oil production.

Figure 8:
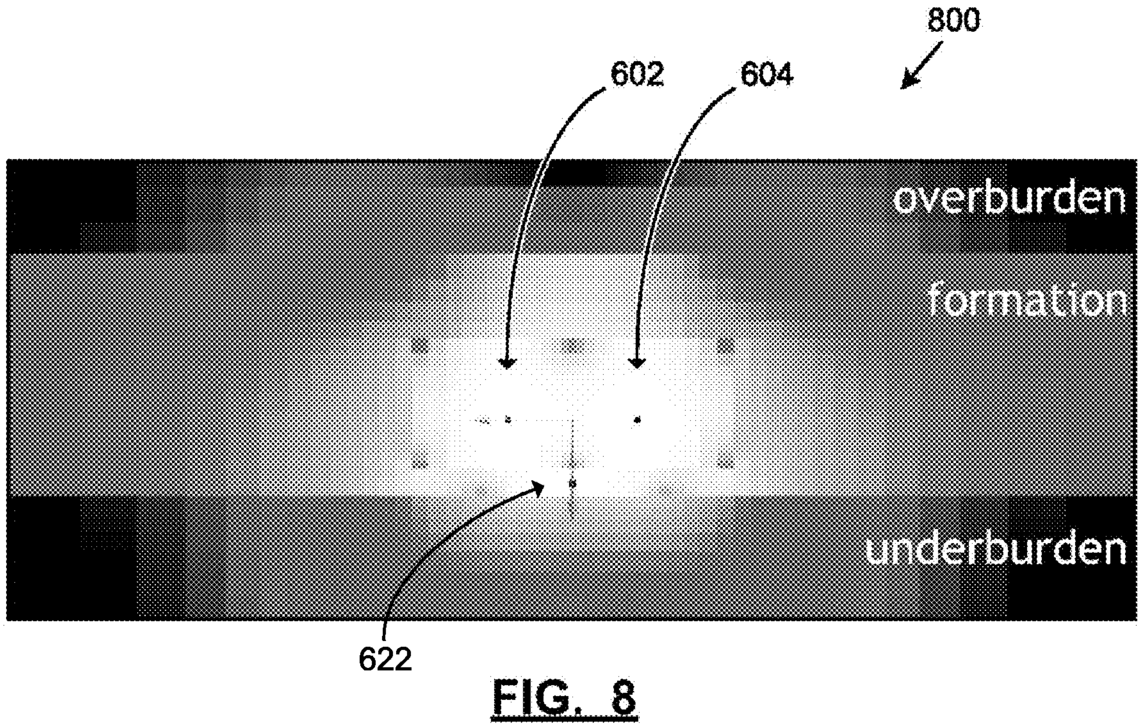
FIG. 8 is an illustration of a cross-sectional view of a radiation pattern generated by the open transmission line of FIG. 6 during later stages of electromagnetic heating.

Referring to FIG. 8, shown therein is an illustration 800 of a cross-sectional view of a radiation pattern generated by the open transmission line of FIG. 6, during later stages of electromagnetic heating. As shown in FIG. 8, the radiation spreads to the same areas in the later stages as that of the early stages shown in FIG. 6. As a result, the desiccated areas immediately surrounding the transmission line conductors 602, 604 continue to be heated. That is, the dessicated areas can be overheated without additional oil production. Areas that are further away from the transmission line conductors 602, 604 can remain unheated, wet, and underproduced.

Figure 9:
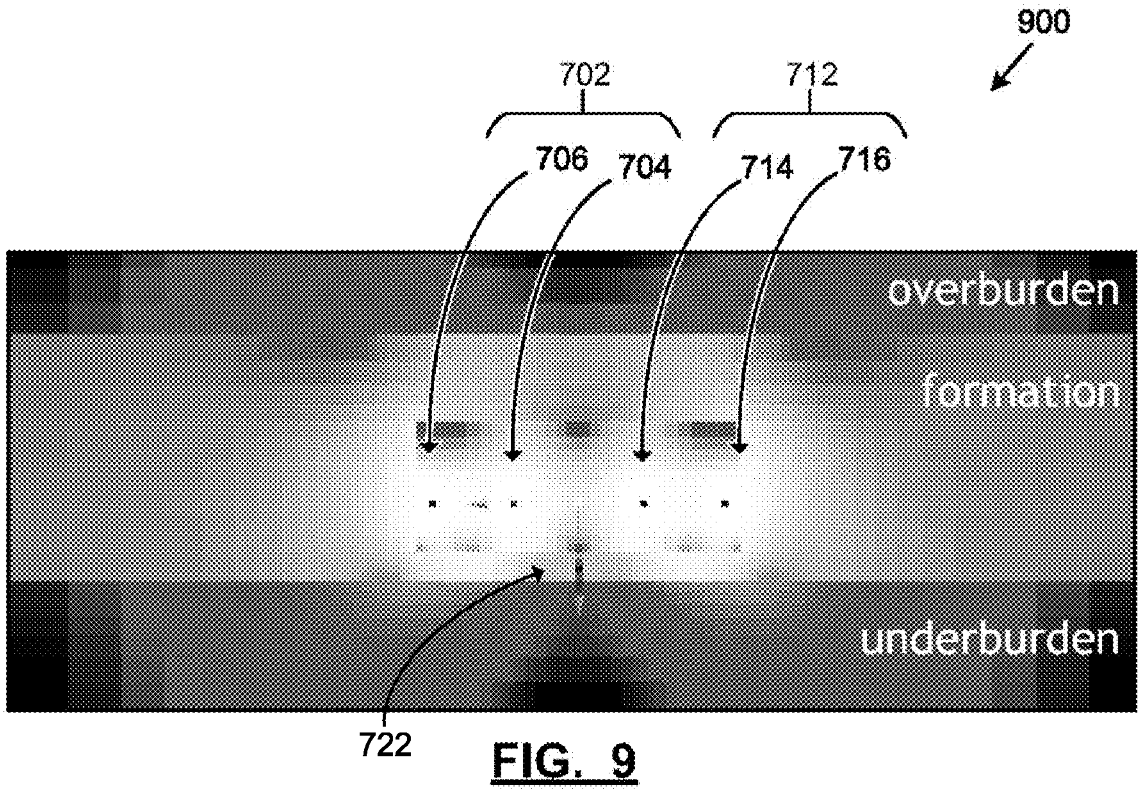
FIG. 9 is an illustration of a cross-sectional view of a radiation pattern generated by the open transmission line of FIG. 7 during later stages of electromagnetic heating.

Referring to FIG. 9, shown therein is an illustration 900 of a cross-sectional view of a radiation pattern generated by the open transmission line of FIG. 7, during later stages of electromagnetic heating, in accordance with at least one embodiment. The secondary arms 706, 716 can extend the penetration of the radiation further into the wet hydrocarbon formation in a lateral direction. That is, the secondary arms 706, 716 can enlarge the perceived radius of the primary arms 704, 714. Thus, the desiccated area can be extended to include the area around the secondary arms 706, 716 as well. As well, by extending the penetration of the radiation further into the wet hydrocarbon formation in a lateral direction, the multilateral open transmission line can reduce unwanted radiation loss in the overburden and underburden.

Figure 10:
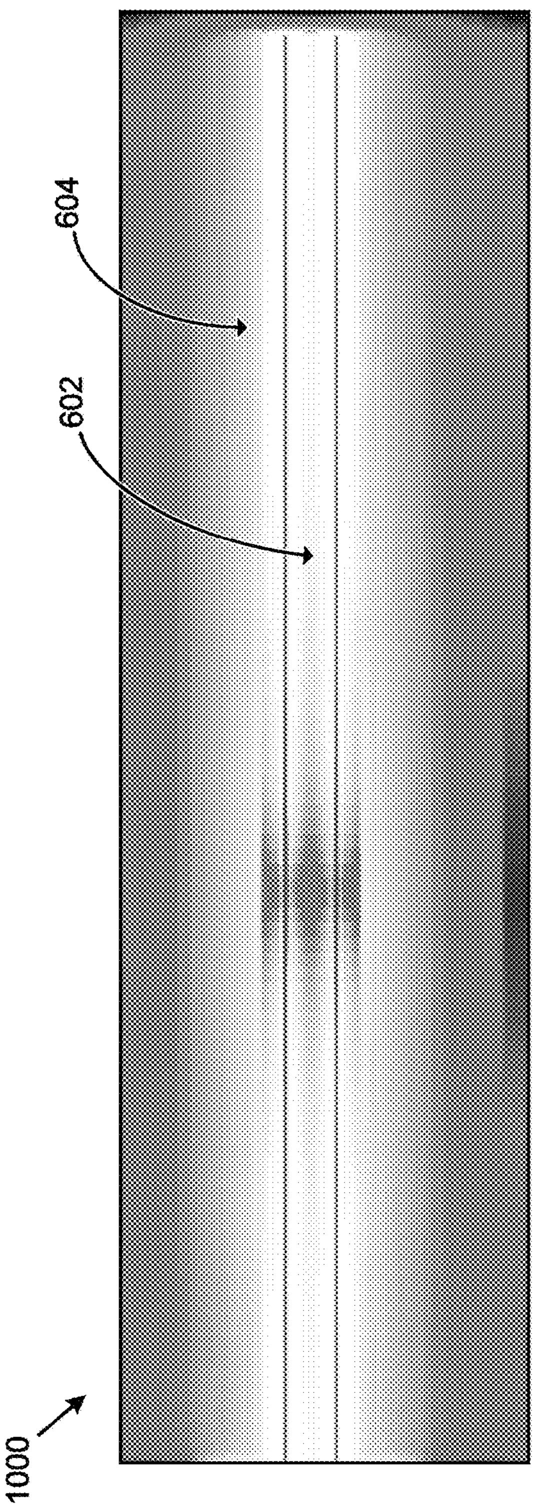
FIG. 10 is an illustration of a top view of a radiation pattern generated by the open transmission line of FIG. 6 in early stages of electromagnetic heating.

Referring to FIG. 10, shown therein is an illustration 1000 of a top view of a radiation pattern generated by the open transmission line of FIG. 6 during early stages of electromagnetic heating. Similar to FIG. 6, the areas immediately surrounding the transmission line conductors 602, 604 are heated and will become dessicated. Areas that are further away from the transmission line conductors 602, 604 are not heated and will remain wet.

Figure 11:
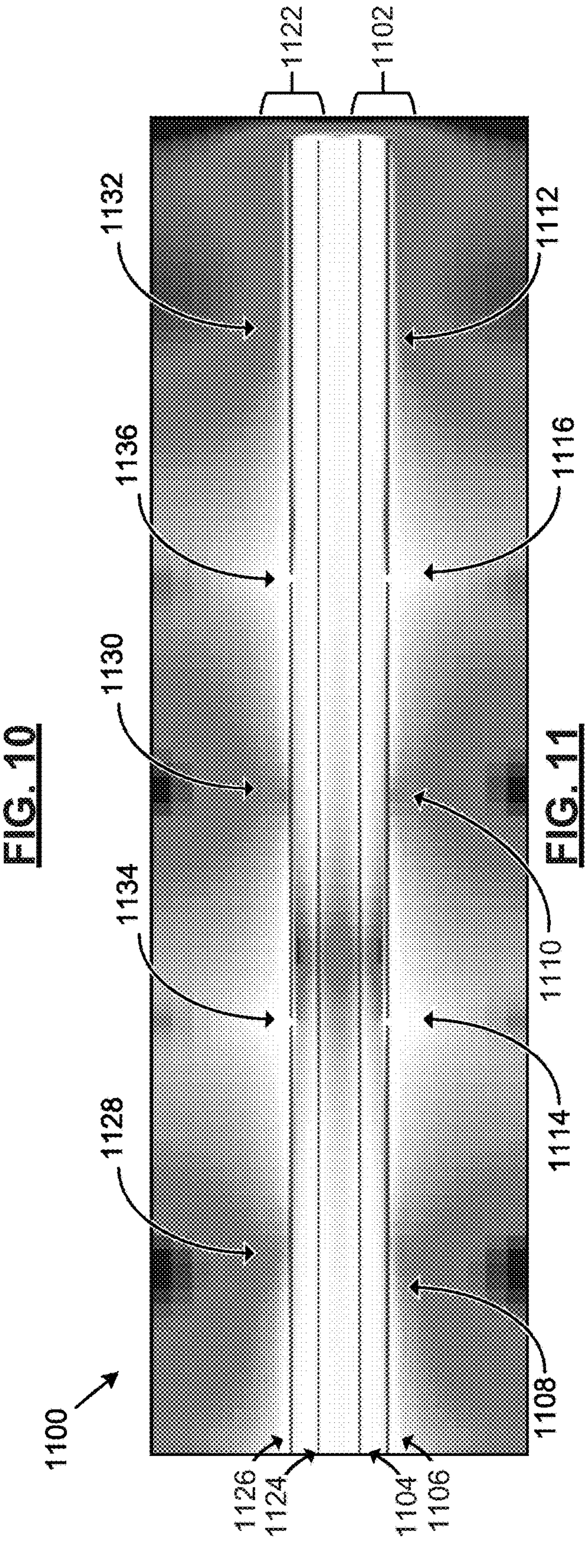
FIG. 11 is an illustration of a top view of a radiation pattern generated by a multilateral open transmission line during early stages of electromagnetic heating, in accordance with at least one embodiment.

Referring to FIG. 11, shown therein is an illustration 1100 of a top view of a radiation pattern generated by a multilateral open transmission line during later stages of electromagnetic heating, in accordance with at least one embodiment. As shown in FIG. 11, the multilateral open transmission line includes two multilateral transmission line conductors 1102, 1122.

Each of the multilateral transmission line conductors 1102, 1122 include a primary arm 1104, 1124, respectively and a secondary arm 1106, 1126, respectively. Furthermore, secondary arm 1106 includes three segments 1108, 1110, and 1112 and electrically isolatable connections 1114 and 1116 between the segments. Similarly, secondary arm 1126 includes three segments 1128, 1130, and 1132 and electrically isolatable connections 1134 and 1136 between the segments.

For example, secondary arm segments 1108, 1110, 1112, 1128, 1130, and 1132 can be formed of electrically conductive segments. The total length of the secondary arms 1108, 1110, 1112, 1128, 1130, and 1132 of each multilateral transmission line conductor 1102, 1122 can have having length that is substantial relative to the wavelength of the alternating current energizing the primary arms 1104, 1124. In at least one embodiment, the total length of the secondary arms 1106, 1126 is approximately 990 meters (m) long.

In at least one embodiment, each secondary arm segment 1108, 1110, 1112, 1128, 1130, and 1132 can be electrically short enough to not affect the electromagnetic field of the primary arms 1104, 1124. That is, the secondary arm segments 1108, 1110, 1112, 1128, 1130, and 1132 can be too electrically short to resonate and radiate EM energy. As a result, the secondary arm segments 1108, 1110, 1112, 1128, 1130, and 1132 do not have any significant effect on the radiated field pattern. Thus, the effect of the secondary arm segments 1108, 1110, 1112, 1128, 1130, and 1132 on the total field distribution is minimal. In at least one embodiment, each secondary arm segment 1108, 1110, 1112, 1128, 1130, and 1132 can be less than a quarter of the wavelength of the alternating current energizing the primary arms 1404, 1124. In at least one embodiment, the length of each of the secondary arm segments 1108, 1110, 1112, 1128, 1130, and 1132 is a sixth of the wavelength of the alternating current energizing the primary arms 1404, 1124. For example, the length of each of the secondary arm segments 1108, 1110, 1112, 1128, 1130, and 1132 can be approximately 330 meters (m) long.

Electrically isolatable connections 1114, 1116, 1134 and 1136 can be formed of pipes made of a dielectric, such as fiberglass. In at least one embodiment, electrically isolatable connections 1114, 1116, 1134 and 1136 can be approximately meters (m) long.

As shown in FIG. 11, the area immediately surrounding the primary arms 1104, 1124 can become desiccated from heating, similar to FIG. 7. Also, when the secondary arms 1106, 1126 are operated passively, the area immediately surrounding the passive secondary arm segments 1108, 1110, 1112, 1128, 1130, and 1132 can remain a wet zone. That is, the passive secondary arm segments 1108, 1110, 1112, 1128, 1130, and 1132 can constrain most of the radiation to be within the region between the passive secondary arm segments 1108, 1110, 1112, 1128, 1130, and 1132.

However, the area immediately surrounding the electrically isolatable connections 1114, 1116, 1134 and 1136 can extend the penetration of the radiation further into the wet hydrocarbon formation in a lateral direction. That is, the perceived radius of the primary arms 1104, 1124 can be enlarged at the electrically isolatable connections 1114, 1116, 1134 and 1136.

Figure 12:
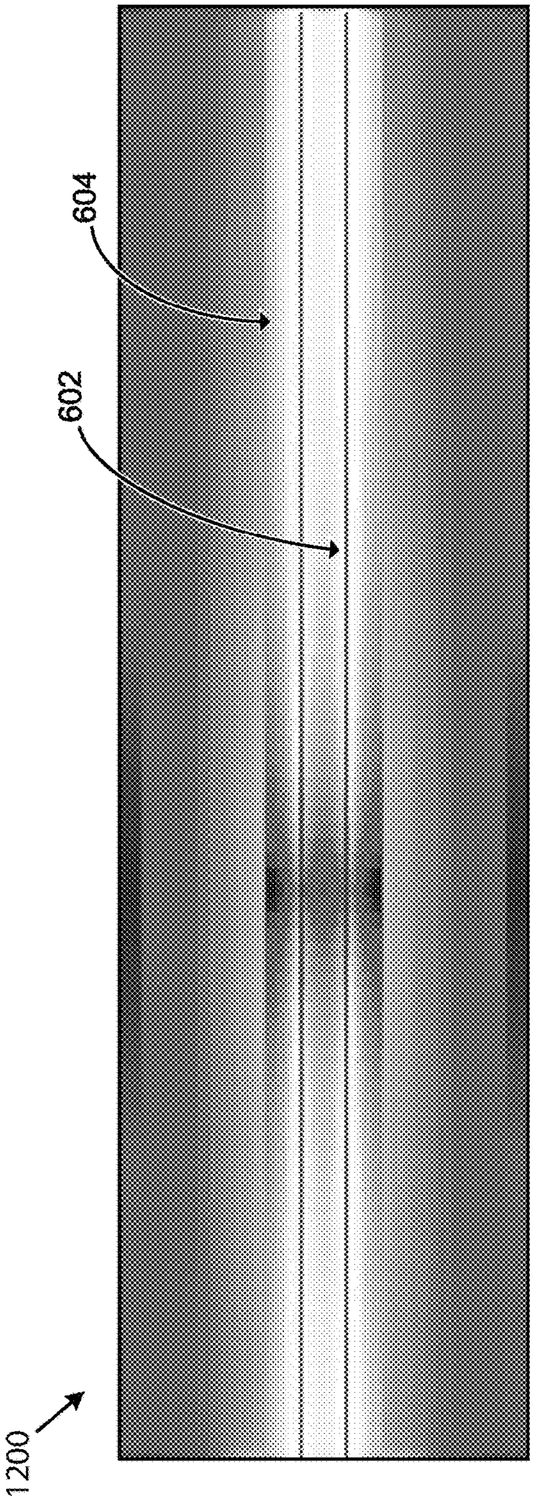
FIG. 12 is an illustration of a top view of a radiation pattern generated by the open transmission line of FIG. 6 during later stages of electromagnetic heating.

Referring to FIG. 12, shown therein is an illustration 1200 of a top view of a radiation pattern generated by the open transmission line of FIG. 6, during later stages of electromagnetic heating. As shown in FIG. 12, the electromagnetic field spreads to the same areas in the later stages as that of the early stages shown in FIG. 10. As a result, the desiccated areas immediately surrounding the transmission line conductors 602, 604 continue to be heated. That is, the desiccated areas can be overheated without additional oil production. Areas that are further away from the transmission line conductors 602, 604 can remain unheated, wet, and underproduced.

Figure 13:
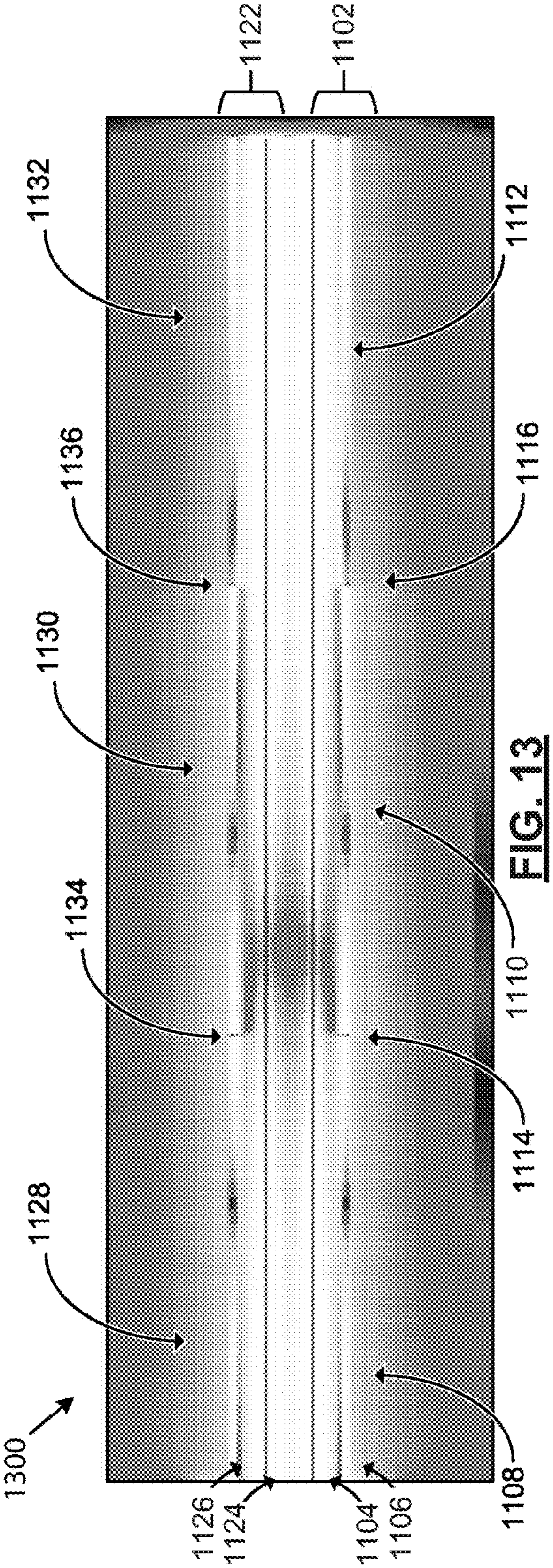
FIG. 13 is an illustration of a top view of a radiation pattern generated by the open transmission line of FIG. 11 during later stages of electromagnetic heating.

Referring to FIG. 13, shown therein is an illustration 1300 of a top view of a radiation pattern generated by the open transmission line of FIG. 11, during later stages of electromagnetic heating, in accordance with at least one embodiment. The secondary arm segments 1108, 1110, 1112, 1128, 1130, and 1132 can extend the penetration of the radiation further into the wet hydrocarbon formation in a lateral direction. That is, the secondary arm segments 1108, 1110, 1112, 1128, 1130, and 1132 can enlarge the perceived radius of the primary arms 1104, 1124. Thus, the secondary arm segments 1108, 1110, 1112, 1128, 1130, and 1132 can enlarge the perceived radius of the primary arms 1104, 1124. Similar to FIG. 9, by extending the penetration of the radiation further into the wet hydrocarbon formation in a lateral direction, the multilateral open transmission line of FIG. 11 can reduce unwanted radiation loss in the overburden and underburden.

As noted above, the length of each of the secondary arm segments 1108, 1110, 1112, 1128, 1130, and 1132 can be too electrically short to resonate and radiate EM energy. As a result, the secondary arm segments 1108, 1110, 1112, 1128, 1130, and 1132 do not have any significant effect on the radiated field pattern.

As shown in FIG. 3, in at least one embodiment, the producer well 342 can also be a multilateral. That is, the producer well 342 can include a primary producer arm 342*a* and at least one secondary producer arm 342*b*, 342*c* extending laterally from the primary producer arm 342*a*.

Figure 14:
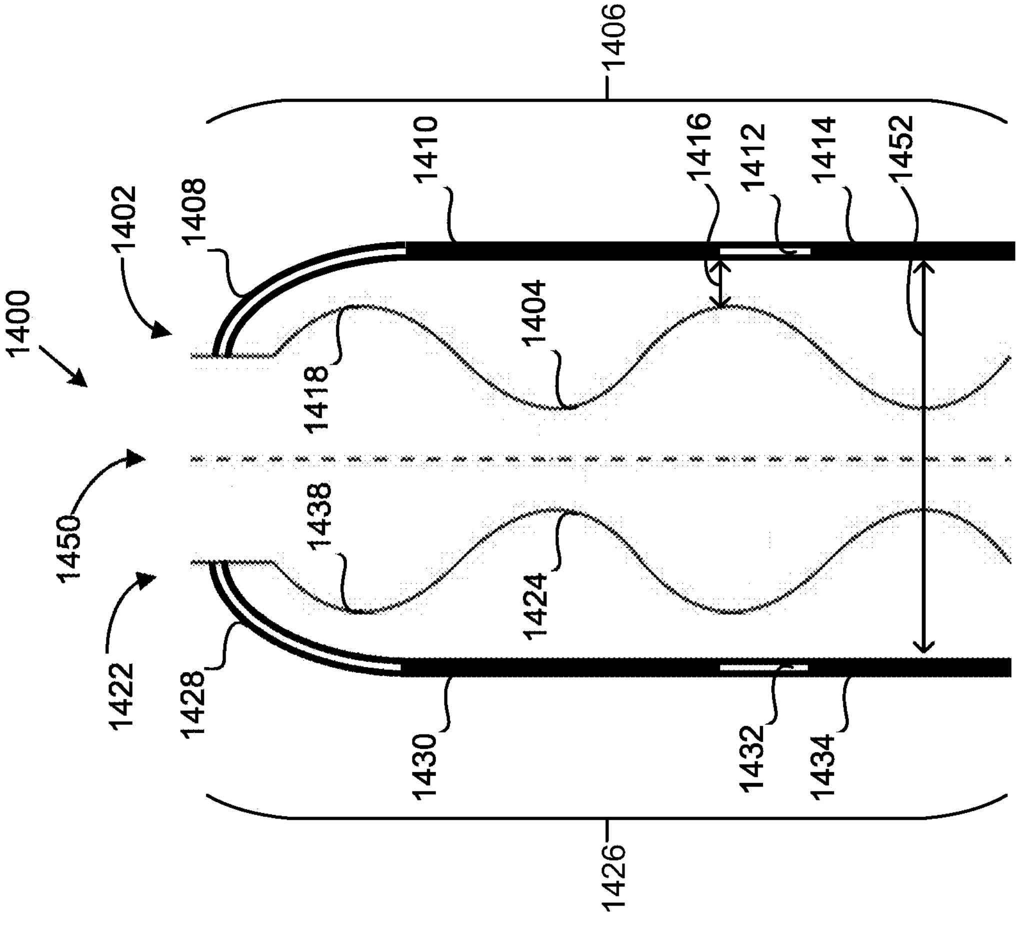
FIG. 14 is a schematic top view of another multilateral open transmission line, in accordance with at least one embodiment.

Referring to FIG. 14, shown therein is a schematic top view of another multilateral open transmission line, in accordance with at least one embodiment. The multilateral open transmission line 1400 shown in FIG. 14 includes a first transmission line conductor 1402 and a second transmission line conductor 1422. Also shown in FIG. 14 is the producer well 1450 defining a longitudinal axis.

Each of the first transmission line conductor 1402 and the second transmission line conductor 1422 are multilateral transmission line conductors. In particular, the first transmission line conductor 1402 includes a primary arm 1404 and a secondary arm 1406 extending laterally from the primary arm 1404. As shown in FIG. 14, the secondary arm 1406 is formed of a plurality of segments 1408, 1410, 1412, and 1414 connected in end-to-end relation. Similarly, the second transmission line conductor 1422 includes a primary arm 1424 and a secondary arm 1426 extending laterally from the primary arm 1424 that is formed of a plurality of segments 1428, 1430, 1432, and 1434 connected in end-to-end relation.

Each of the primary arms 1404, 1424 have a waveform-like shape along the longitudinal axis, forming at least one crest 1418, 1438. Thus, the primary arms 1404, 1424 can be referred to as undulating.

The secondary arms 1406, 1426 can be located on the outside of the primary arms 1404, 1424. Furthermore, the secondary arms 1406, 1426 can be located in approximately the same plane as that formed by the undulating primary arms 1404, 1424. In at least one embodiment, the distance 1452 between the two secondary arms 1406, 1426 can be approximately 32 meters (m).

In at least one embodiment, the shortest distance 1416 between the secondary arm 1406, 1426 and the primary arm 1404, 1424 from which it extends can be approximately 6 meters (m). The electromagnetic field strength at the secondary arm 1406, 1426 can depend on the distance between the secondary arm 1406, 1426 and the respective primary arm 1404, 1424 from which it extends, as well as the frequency of the alternating current energizing the transmission line. At very high frequencies, the alternating current energizing the transmission line can be attenuated before the secondary arm 1406, 1426, resulting in an electromagnetic field strength at the secondary arm 1406, 1426 that is insignificant. To ensure that the electromagnetic field strength is still significant at the secondary arm 1406, 1426, the distance between the secondary arm 1406, 1425 and the respective primary arm 1404, 1424 can be selected to ensure that at very high frequencies of operation for at least a partially dessicated formation, the alternating current energizing the transmission is not attenuated before the secondary arm 1406, 1426. In at least one embodiment, an electromagnetic field strength that is at least 10 decibels (dB) can be considered to be significant.

FIG. 14 is provided for illustration purposes only and other configurations are possible. For example, the open transmission line 1400 can include any number of additional transmission line conductors. In addition, although the first transmission line conductor 1402 and the second transmission line conductor 1422 are each shown as being a multilateral transmission line conductor, in at least one embodiment, only one of the first transmission line conductor 1402 and the second transmission line conductor 1422 is a multilateral transmission line conductor.

Any one or both of the secondary arms 1406, 1426 can be located on the inside of the primary arms 1404, 1424. Furthermore, the secondary arms 1406, 1426 may not be located in the same plane as that formed by the undulating primary arms 1404, 1424.

As well, while both secondary arms 1406, 1426 of the first and second transmission line conductors 1402, 1422 are shown as being formed of four segments, the secondary arms 1406, 1426 can be formed of fewer or more segments. For example, in at least one embodiment, the secondary arm 1406 of the first transmission line conductor 1402 can be formed of four segments and the secondary arm 1426 of the second transmission line conductor 1422 can be formed of five segments. Furthermore, while both secondary arms 1406, 1426 of the first and second transmission line conductors 1402, 1422 are shown as being formed of a plurality of segments, in at least one embodiment, only one of the secondary arms 1406, 1426 is formed of a plurality of segments.

Figure 15:
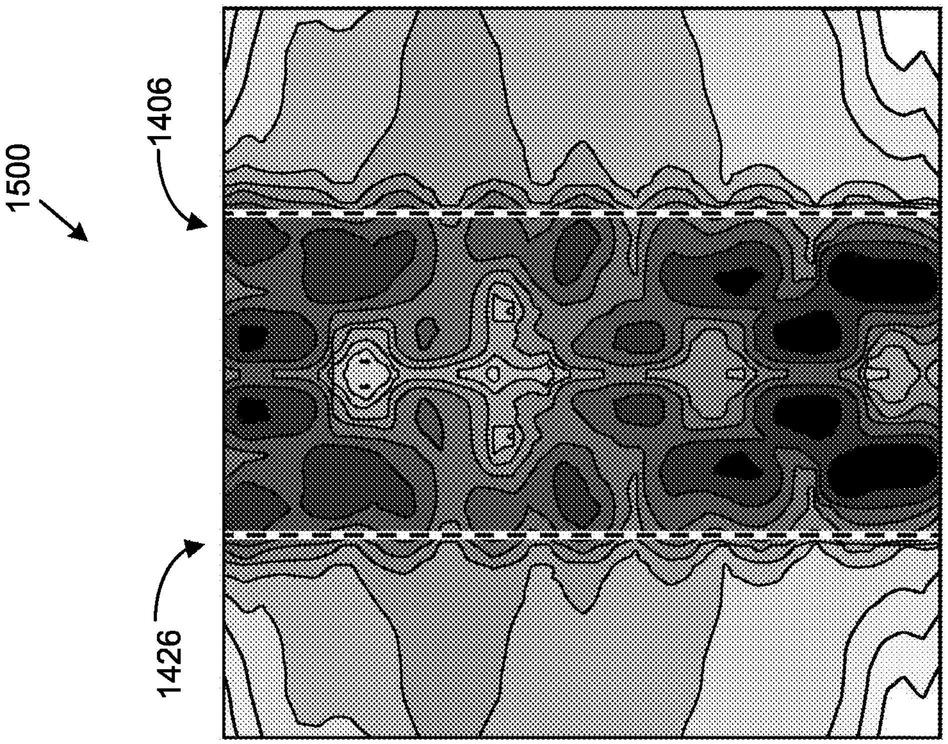
FIG. 15 is an illustration of a top view of a portion of an electromagnetic field pattern generated by the multilateral open transmission line of FIG. 14.

Referring to FIG. 15, shown therein is an illustration 1500 of a top view of a portion of an electromagnetic field pattern generated by the multilateral open transmission line 1400 of FIG. 14, in accordance with at least one embodiment. The location of the secondary arms 1406, 1426 are denoted by the dashed line.

Similar to FIGS. 7 and 11, the areas immediately surrounding the primary arms 1504, 1524, particularly between the primary arms 1504, 1524 are heated and will become dessicated. However, the secondary arms 1506, 1526 can be operated passively. As a result, the area immediately surrounding the secondary arms will remain a wet zone, outside of the region dessicated by the primary arms 1504, 1524. Operation of the secondary arms 1506, 1526 passively in the early stages can block the radiation from spreading laterally into the wet hydrocarbon formation, constraining most of the radiation to be within the region between the passive secondary arms 1506, 1526.

The electromagnetic field pattern generated by the multilateral open transmission line 1400 has a more uniform electromagnetic heating pattern along the length of the longitudinal axis than an electromagnetic field pattern generated by an open transmission line only including undulating transmission line conductors without secondary arms. A more electromagnetic uniform heating pattern along the length of the longitudinal axis can allow oil to be produced along the length of the producer simultaneously.

As noted above, with multilateral open transmission line, various heating patterns can be achieved. For example, a multilateral open transmission line can be operated to achieve a wider, flatter, and more uniform heating area. Such a heating area can be favourable for maintaining separation of the steam chamber from the producer well.

Figure 16:
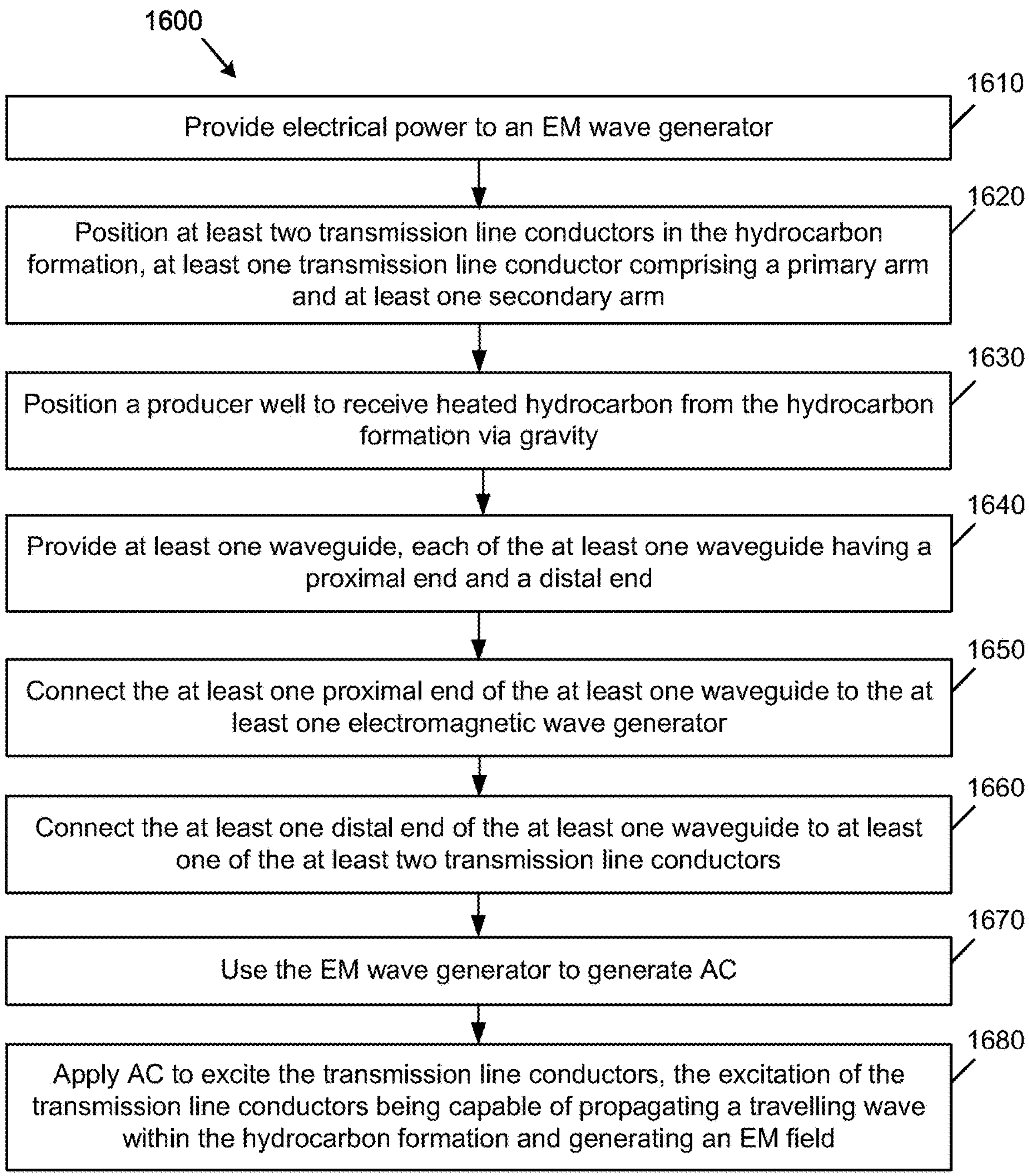
FIG. 16 is a flowchart diagram of an example method for electromagnetic heating of a hydrocarbon formation, in accordance with at least one embodiment.

Referring now to FIG. 16, shown therein is a flowchart diagram of an example method 1600 for electromagnetic heating of a hydrocarbon formation, in accordance with at least one embodiment.

Method 1600 begins at 1610 with providing electrical power to at least one EM wave generator for generating alternating current. The at least on EM wave generator can be, for example, EM wave generator 108.

At 1620, at least two transmission line conductors are positioned in the hydrocarbon formation. At least a portion of each of the transmission line conductors extend along a longitudinal axis. At least one of the transmission line conductors include a primary arm and at least one secondary arm extending laterally from the primary arm and at least a portion of the at least one secondary arm is electrically isolatable. The at least one of the transmission line conductor including a primary arm and at least one secondary arm can, for example, be any one of multilateral transmission line conductors 202, 212, 302, 322, 402, 422, 500, 702, 712, 1102, 1122, 1402, and 1422.

At 1630, a producer well is positioned to receive hydrocarbon from the hydrocarbon formation via gravity. In particular, the producer well is positioned laterally between the transmission line conductors and at a greater depth underground than at least one of the transmission line conductors. The length of the producer well defines the longitudinal axis. The producer well can be for example, producer well 122, 1450.

At 1640, at least one waveguide is provided. Each of the at least one waveguide can have a proximal end and a distal end. At 1650, the at least one proximal end of the at least one waveguide can be connected to the at least one EM wave generator. At 1660, the at least one distal end of the at least one waveguide can be connected to at least one of the at least two transmission line conductors.

At 1670, the at least one EM wave generator can be used to generate high frequency alternating current.

At 1680, the high frequency alternating current from the at least one EM wave generator is applied to the at least two transmission line conductors to excite the at least two transmission line conductors. The excitation of the at least two transmission line conductors propagates a travelling wave within the hydrocarbon formation and generates an electromagnetic field.

In at least one embodiment, the method 1600 can further involve electrically isolating at least a portion of a secondary arm of the at least one secondary arm to operate the secondary arm passively. Electrically isolating the portion of a secondary arm can involve opening a switch or providing electrical insulation along the secondary arm.

In at least one embodiment, the method 1600 can further involve electrically connecting at least a portion of the secondary arm to operate the secondary arm actively. Electrically connecting the portion of a secondary arm can involve closing a switch along the secondary arm.

In at least one embodiment, when a secondary arm of the at least one secondary arm includes a plurality of segments connected in end-to-end relation by electrically isolatable connections and the plurality of segments include a first segment and a second segment that is adjacent and distal to the first segment, electrically isolating at least a portion of the secondary arm to operate the secondary arm passively can involve: (i) when the first segment and the second segment are electrically connected, electrically isolating the second segment to operate the second segment passively and the first segment actively; and (ii) electrically isolating the first segment to operate the first segment and the second segment passively.

For example, returning to the multilateral open transmission line 300 of FIG. 3, secondary arm segment 314 can be distal to secondary arm segment 310 and switches can be provided at electrically isolatable connections 308 and 312. The secondary arm 306 can be operated passively by electrically isolating secondary arm segment 314, that is, opening switch 312, to operate the secondary arm segment 314 passively. Meanwhile the secondary arm segment 310 can operated actively by switch 308 in a closed state. Subsequently, the secondary arm 306 can be operated passively by opening switch 308 to operate the secondary arm segments 310 and 314 passively.

Furthermore, electrically isolating at least a portion of the secondary arm to operate the secondary arm actively can involve: (i) when the first segment and the second segment are electrically isolated, electrically connecting the first segment to operate the first segment actively and the second segment passively; and (ii) electrically connecting the second segment to operate the first segment and the second segment actively.

Returning to the example of multilateral open transmission line 300 of FIG. 3, the secondary arm 306 can be operated actively by electrically connecting secondary arm segment 310, that is, closing switch 308, to operate the secondary arm segment 310 actively. Meanwhile the secondary arm segment 314 can operated passively by maintaining switch 308 in an open state. Subsequently, the secondary arm 306 can be operated actively by closing switch 312 to operate the secondary arm segments 310 and 314 actively.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. An apparatus for electromagnetic heating of an underground hydrocarbon formation, the apparatus comprising:

(a) at least one electromagnetic power source for generating a time-varying current or a time-varying voltage;

(b) at least two transmission line conductors positioned in the hydrocarbon formation, the transmission line conductors electrically connected at a proximal end to the at least one electromagnetic power source, the transmission line conductors being excitable by the time-varying current or the time-varying voltage to propagate an electromagnetic wave within the hydrocarbon formation, at least one of the transmission line conductors comprise a primary arm and at least one secondary arm branching from the primary arm, the at least one secondary arm comprising at least one electrically isolatable connection for electrically isolating at least a portion of the at least one secondary arm;

(c) at least one waveguide for carrying the time-varying current or the time-varying voltage from the at least one electromagnetic power source to the transmission line conductors, each of the at least one waveguide having a proximal end and a distal end, the proximal end of the at least one waveguide being connected to the at least one electromagnetic power source, the distal end of the at least one waveguide being connected to at least one of the transmission line conductors; and (d) a producer well having a length that defines a longitudinal axis, at least a portion of each of the transmission line conductors extend along the longitudinal axis, at least a portion of the producer well being positioned laterally between the transmission line conductors and at a greater depth underground than at least one of the transmission line conductors to receive heated hydrocarbons from the hydrocarbon formation via gravity.

2. The apparatus of claim 1, wherein one or more electrically isolatable connections of the at least one electrically isolatable connection is located at a junction between the primary arm and one or more secondary arms of the at least one secondary arm.

3. The apparatus of claim 2, wherein the one or more secondary arms have a length that is substantial relative to the wavelength of the time-varying current or the time-varying voltage propagating in the hydrocarbon formation.

4. The apparatus of claim 1, wherein one or more secondary arms of the at least one secondary arm comprise a plurality of segments connected in end-to-end relation by electrically isolatable connections.

5. The apparatus of claim 4, wherein each segment has a length that is substantially shorter in length than a quarter of the wavelength of the time-varying current or the time-varying voltage propagating in the hydrocarbon formation.

6. The apparatus of claim 1, wherein the at least one electrically isolatable connection comprises electrical insulation.

7. The apparatus of claim 1, wherein the at least one electrically isolatable connection comprises at least one electrical switch for electrically connecting the at least a portion of the secondary arm.

8. The apparatus of claim 7, wherein the at least one electrical switch is remotely controllable above ground.

9. The apparatus of claim 7, wherein control of the at least one electrical switch is automated.

10. The apparatus of claim 1, wherein the producer well comprises a primary producer arm and at least one secondary producer arm branching from the primary producer arm.

11. A method for electromagnetically heating an underground hydrocarbon formation, the method comprising:

(a) providing at least one electromagnetic power source for generating a time-varying current or a time-varying voltage;

(b) positioning at least two transmission line conductors in the hydrocarbon formation, at least one of the transmission line conductors comprise a primary arm and at least one secondary arm branching from the primary arm, at least a portion of the at least one secondary arm being electrically isolatable;

(c) positioning at least a portion of a producer well laterally between the transmission line conductors and at a greater depth underground than at least one of the transmission line conductors to receive heated hydrocarbons from the hydrocarbon formation via gravity, the producer well having a length that defines a longitudinal axis, at least a portion of each of the transmission line conductors extend along the longitudinal axis;

(d) providing at least one waveguide, each of the at least one waveguide having a proximal end and a distal end;

(e) connecting the at least one proximal end of the at least one waveguide to the at least one electromagnetic power source;

(f) connecting the at least one distal end of the at least one waveguide to at least one of the transmission line conductors;

(g) using the at least one electromagnetic power source to generate the time-varying current or the time-varying voltage; and (h) applying the time-varying current or the time-varying voltage to excite the transmission line conductors, the excitation of the transmission line conductors being capable of propagating an electromagnetic wave within the hydrocarbon formation and generating an electromagnetic field.

12. The method of claim 11, further comprising remotely controlling at least one electrical switch above-ground to electrically isolate or connect at least a portion of one or more secondary arms of the at least one secondary arm.

13. The method of claim 11, further comprising automating control of at least one electrical switch to electrically isolate or connect at least a portion of one or more secondary arms of the at least one secondary arm.

14. The method of claim 11 comprises connecting a plurality of segments in end-to-end relation with electrically isolatable connections to provide one or more secondary arms of the at least secondary arm, the plurality of segments comprising a first segment and a second segment that is adjacent and distal to the first segment.

15. The method of claim 14, further comprising, when the first segment and the second segment are electrically connected, electrically isolating the second segment to operate the second segment passively and the first segment actively.

16. The method of claim 14, further comprising electrically isolating the first segment to operate the first segment and the second segment passively.

17. The method of claim 14, further comprising, when the first segment and the second segment are electrically isolated, electrically connecting the first segment to operate the first segment actively and the second segment passively.

18. The method of claim 14, further comprising electrically connecting the second segment to operate the first segment and the second segment actively.

19. The method of claim 11, further comprising electrically connecting at least a portion of one or more secondary arms of the at least one secondary arm to operate the secondary arm actively.

20. The method of claim 11, further comprising electrically isolating at least a portion of one or more secondary arms of the at least one secondary arm to operate the secondary arm passively.

* * * * *